US011615799B2

(12) United States Patent
Zhu et al.

(10) Patent No.: US 11,615,799 B2
(45) Date of Patent: Mar. 28, 2023

(54) AUTOMATED MEETING MINUTES GENERATOR

(71) Applicant: MICROSOFT TECHNOLOGY LICENSING, LLC, Redmond, WA (US)

(72) Inventors: Chenguang Zhu, Sammamish, WA (US); Yu Shi, Bellevue, WA (US); William Isaac Hinthorn, Seattle, WA (US); Nanshan Zeng, Bellevue, WA (US); Ruochen Xu, Bellevue, WA (US); Liyang Lu, Redmond, WA (US); Xuedong Huang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

(21) Appl. No.: 16/887,806

(22) Filed: May 29, 2020

(65) Prior Publication Data

US 2021/0375289 A1 Dec. 2, 2021

(51) Int. Cl.
*G10L 15/26* (2006.01)
*G06F 16/383* (2019.01)
*G06N 3/08* (2006.01)
*G06Q 10/06* (2012.01)
*G06Q 10/10* (2012.01)
*G10L 13/08* (2013.01)
*G06Q 10/0631* (2023.01)

(52) U.S. Cl.
CPC ............ *G10L 15/26* (2013.01); *G06F 16/383* (2019.01); *G06N 3/08* (2013.01); *G06Q 10/063118* (2013.01); *G06Q 10/103* (2013.01); *G10L 13/08* (2013.01)

(58) Field of Classification Search
CPC ....... G10L 15/26; G10L 13/08; G06F 16/383; G06N 3/08; G06Q 10/063118; G06Q 10/103
See application file for complete search history.

(56) References Cited

U.S. PATENT DOCUMENTS

| 6,754,631 | B1 | 6/2004 | Din |
| 7,962,525 | B2 | 6/2011 | Kansal |
| 8,688,446 | B2 | 4/2014 | Yanagihara |

(Continued)

OTHER PUBLICATIONS

"Smarter Meetings, Automated Minutes", Retrieved from: https://web.archive.org/web/20190830200512/https://www.voicea.com/, Aug. 30, 2019, 06 Pages.

(Continued)

*Primary Examiner* — Bhavesh M Mehta
*Assistant Examiner* — Darioush Agahi
(74) *Attorney, Agent, or Firm* — Workman Nydegger

(57) ABSTRACT

A transcription of audio speech included in electronic content associated with a meeting is created by an ASR model trained on speech-to-text data. The transcription is post-processed by modifying text included in the transcription, for example, by modifying punctuation, grammar, or formatting introduced by the ASR model and by changing or omitting one or more words that were included in both the audio speech and the transcription. After the transcription is post-processed, output based on the post-processed transcription is generated in the form of a meeting summary and/or template.

20 Claims, 10 Drawing Sheets

(56) References Cited

U.S. PATENT DOCUMENTS

| | | | |
|---|---|---|---|
| 8,688,447 B1* | 4/2014 | De | G10L 15/1815 |
| | | | 704/235 |
| 9,235,862 B1* | 1/2016 | Radner | G06Q 50/01 |
| 9,799,327 B1 | 10/2017 | Chan et al. | |
| 10,192,552 B2 | 1/2019 | Raitio et al. | |
| 10,204,158 B2 | 2/2019 | Hay et al. | |
| 2007/0288518 A1* | 12/2007 | Crigler | G06F 16/48 |
| 2015/0106091 A1 | 4/2015 | Larsen et al. | |
| 2016/0065731 A1* | 3/2016 | Kurstak | H04M 1/724 |
| | | | 455/414.1 |
| 2017/0161258 A1 | 6/2017 | Astigarraga et al. | |
| 2018/0068653 A1 | 3/2018 | Trawick et al. | |
| 2019/0074987 A1 | 3/2019 | Wiener et al. | |
| 2019/0266240 A1* | 8/2019 | Georges | G10L 15/142 |
| 2019/0327103 A1* | 10/2019 | Niekrasz | H04L 12/1831 |
| 2019/0341050 A1 | 11/2019 | Diamant et al. | |
| 2019/0392837 A1 | 12/2019 | Jung et al. | |
| 2020/0105274 A1* | 4/2020 | Joller | G10L 25/63 |
| 2020/0145616 A1 | 5/2020 | Nassar | |
| 2020/0279568 A1* | 9/2020 | Vaquero Aviles-Casco | |
| | | | G10L 17/06 |
| 2020/0285663 A1* | 9/2020 | Karn | G06N 3/0445 |
| 2020/0302112 A1* | 9/2020 | Helm | G10L 15/08 |
| 2020/0311122 A1* | 10/2020 | Ramamurthy | G06F 16/483 |
| 2020/0394258 A1* | 12/2020 | Chen | G06F 40/284 |
| 2021/0350786 A1* | 11/2021 | Chen | G10L 15/063 |
| 2021/0375291 A1 | 12/2021 | Zeng et al. | |

OTHER PUBLICATIONS

Anantaram, et al., "Repairing General-Purpose ASR Output to Improve Accuracy of Spoken Sentences in Specific Domains Using Artificial Development Approach", In Proceedings of the Twenty-Fifth International Joint Conference on Artificial Intelligence, Jul. 9, 2016, pp. 4234-4235.

Bassil, et al., "Post-Editing Error Correction Algorithm for Speech Recognition using Bing Spelling Suggestion", In International Journal of Advanced Computer Science and Applications, vol. 3, Issue 2, Feb. 2012, pp. 95-101.

Batista, et al., "Recovering Capitalization and Punctuation Marks for Automatic Speech Recognition: Case Study for Portuguese Broadcast News", In Journal of Speech Communication, vol. 50, Issue 10, Oct. 2008, pp. 847-862.

Bohac, et al., "Post-Processing of the Recognized Speech for Web Presentation of Large Audio Archive", In Proceedings of 35th International Conference on Telecommunications and Signal Processing, Jul. 3, 2012, pp. 441-445.

Bojar, et al., "Findings of the 2016 Conference on Machine Translation", In Proceedings of the First Conference on Machine Translation, vol. 2: Shared Task Papers, Aug. 11, 2016, pp. 131-198.

Bryant, et al., "The BEA-2019 Shared Task on Grammatical Error Correction", In Proceedings of the Fourteenth Workshop on Innovative Use of NLP for Building Educational Applications, Aug. 2, 2019, pp. 52-75.

Chatterjee, et al., "Multi-source Neural Automatic Post-Editing: FBK's participation in the WMT 2017 APE shared task", In Proceedings of the Conference on Machine Translation (WMT), vol. 2: Shared Task Papers, Sep. 7, 2017, pp. 630-638.

Cho, et al., "Punctuation Insertion for Real-time Spoken Language Translation", In Proceedings of the Eleventh International Workshop on Spoken Language Translation, Dec. 4, 2014, 07 Pages.

Cho, et al., "Segmentation and Punctuation Prediction in Speech Language Translation Using a Monolingual Translation System", In Proceedings of International Workshop on Spoken Language Translation, Dec. 6, 2012, pp. 252-259.

Choe, et al., "A Neural Grammatical Error Correction System Built On Better Pre-training and Sequential Transfer Learning", In Journal of Computing Research Repository, Jul. 2, 2019, 15 Pages.

Cucu, et al., "Statistical Error Correction Methods for Domain-Specific ASR Systems", In Proceedings of International Conference on Statistical Language and Speech Processing, Jul. 29, 2013, pp. 83-92.

Dahlmeier, et al., "Better Evaluation for Grammatical Error Correction", In Proceedings of Conference of the North American Chapter of the Association for Computational Linguistics: Human Language Technologies, Jun. 3, 2012, pp. 568-572.

Dai, et al., "Semi-supervised sequence learning", In Proceedings of the Advances in Neural Information Processing Systems, Nov. 4, 2015, pp. 1-10.

Deng, "Modeling Multi-speaker Latent Space to Improve Neural TTS: Quick Enrolling New Speaker and Enhancing Premium Voice", In Journal of Computing Research Repository, Dec. 13, 2018, 5 Pages.

Devlin, et al., "BERT: Pre-training of Deep Bidirectional Transformers for Language Understanding", In Journal of Computing Research Repository, Oct. 11, 2018, 14 Pages.

Dong, et al., "Unified Language Model Pre-Training for Natural Language Understanding And Generation", In Journal of Computing Research Repository, May 8, 2019, 13 Pages.

Fan, et al., "Controllable Abstractive Summarization", In Journal of Computing Research Repository, Nov. 14, 2017, 10 Pages.

Ge, et al., "Reaching Human-level Performance in Automatic Grammatical Error Correction: An Empirical Study", In Journal of Computing Research Repository, Jul. 3, 2018, 15 Pages.

Gravano, et al., "Restoring Punctuation and Capitalization in Transcribed Speech", In Proceedings of International Conference on Acoustics, Speech and Signal Processing, Apr. 19, 2009, pp. 4741-4744.

Grundkiewicz, et al., "Neural Grammatical Error Correction Systems with Unsupervised Pre-training on Synthetic Data", In Proceedings of the Fourteenth Workshop on Innovative Use of NLP for Building Educational Applications, Aug. 2, 2019, pp. 252-263.

Guo, et al., "A Spelling Correction Model for End-to-end Speech Recognition", In Proceedings of IEEE International Conference on Acoustics, Speech and Signal Processing, May 12, 2019, pp. 5651-5655.

Hokamp, Chris, "Ensembling Factored Neural Machine Translation Models for Automatic Post-Editing and Quality Estimation", In Journal of Computing Research Repository, Jun. 15, 2017, 07 Pages.

Howard, et al., "Universal Language Model Fine-Tuning For Text Classification", In Proceedings of 56th Annual Meeting of the Association for Computational Linguistics, vol. 1, Jul. 15, 2018, pp. 328-339.

Hrinchuk, et al., "Correction of Automatic Speech Recognition with Transformer Sequence-to-sequence Model", In Journal of Computing Research Repository, Oct. 23, 2019, 05 Pages.

Kiyono, et al., "An Empirical Study of Incorporating Pseudo Data into Grammatical Error Correction", In Journal of Computing Research Repository, Sep. 2, 2019, 13 Pages.

Kumar, et al., "Dialogue Act Sequence Labeling Using Hierarchical Encoder with CRF", In Proceedings of the Thirty-Second AAAI Conference on Artificial Intelligence, Apr. 29, 2018, pp. 3440-3447.

Lewis, et al., "BART: Denoising Sequence-to-Sequence Pretraining for Natural Language Generation, Translation, and Comprehension", In Journal of Computing Research Repository, Oct. 29, 2019, 10 Pages.

Liao, et al., "Improving Readability for Automatic Speech Recognition Transcription", In Journal of Computing Research Repository, Apr. 9, 2020, 11 Pages.

Lin, et al., "ORANGE: a Method for Evaluating Automatic Evaluation Metrics for Machine Translation", In Proceedings of the 20th International Conference on Computational Linguistics, Aug. 23, 2004, 07 Pages.

Liu, et al., "Reading Turn by Turn: Hierarchical Attention Architecture for Spoken Dialogue Comprehension", In Proceedings of the 57th Annual Meeting of the Association for Computational Linguistics, Jul. 28, 2019, pp. 5460-5466.

Liu, et al., "Roberta: A Robustly Optimized Bert Pretraining Approach.", In Journal of Computing Research Repository, Jul. 26, 2019, 13 Pages.

Liyanapathirana, et al., "Using the TED Talks to Evaluate Spoken Post-editing of Machine Translation", In Proceedings of the Tenth International Conference on Language Resources and Evaluation, May 2016, pp. 2232-2239.

(56) References Cited

OTHER PUBLICATIONS

McCann, et al., "Learned in Translation: Contextualized Word Vectors", In Advances in Neural Information Processing Systems, Dec. 4, 2017, 12 Pages.

Mizumoto, et al., "Mining revision log of language learning sns for automated Japanese error correction of second anguage learners", In Proceedings of 5th International Joint Conference on Natural Language Processing, Nov. 8, 2011, pp. 147-155.

Napoles, et al., "Enabling Robust Grammatical Error Correction in New Domains: Data Sets, Metrics, and Analyses", In Journal of Transactions of the Association for Computational Linguistics, vol. 7, Sep. 2019, pp. 551-566.

Napoles, "Ground Truth for Grammaticality Correction Metrics", In Proceedings of the 53rd Annual Meeting of the Association for Computational Linguistics and the 7th International Joint Conference on Natural Language Processing (Short Papers), Jul. 26, 2015, pp. 588-593.

Napoles, et al., "JFLEG: A Fluency Corpus and Benchmark for Grammatical Error Correction", In Journal of Computing Research Repository, Feb. 14, 2017, 06 Pages.

Napoles, et al., "The CoNLL-2014 Shared Task on Grammatical Error Correction", In Proceedings of the Eighteenth Conference on Computational Natural Language Learning: Shared Task, Jul. 26, 2014, pp. 1-14.

Pal, et al., "A Neural Network based Approach to Automatic Post-Editing", In Proceedings of the 54th Annual Meeting of the Association for Computational Linguistics, Aug. 7, 2016, pp. 281-286.

Pal, "Neural Automatic Post-Editing Using Prior Alignment and Reranking", In Proceedings of the 15th Conference of the European Chapter of the Association for Computational Linguistics: vol. 2, Short Papers, Apr. 3, 2017, pp. 349-355.

Papineni, et al., "BLEU: A Method for Automatic Evaluation of Machine Translation", In Proceedings of the 40th Annual Meeting on Association for Computational Linguistics, Jul. 6, 2002, pp. 311-318.

Papineni, Kishore, "Machine Translation Evaluation: N-grams to the Rescue", In Proceedings of the Third International Conference on Language Resources and Evaluation, May 2002, 02 Pages.

Paulik, et al., "Sentence Segmentation and Punctuation Recovery for Spoken Language Translation", In Proceedings of IEEE International Conference on Acoustics, Speech and Signal Processing, Mar. 31, 2008, pp. 5105-5108.

Paulus, et al., "A Deep Reinforced Model for Abstractive Summarization", In Journal of Computing Research Repository, May 11, 2017, 10 Pages.

"Application as Filed in PCT Application No. PCT/US20/017388", Filed Date: Feb. 9, 2020, 45 Pages.

Radford, et al., "Improving Language Understanding by Generative Pre-Training", Retrieved from: https://s3-us-west-2.amazonaws.com/openai-assets/research-covers/language-unsupervised/language_understanding_paper.pdf, 2018, 12 Pages.

Radford, et al., "Language Models are Unsupervised Multitask Learners", In Journal of OpenAI Blog, vol. 1, Issue 8, Feb. 2019, 24 Pages.

Raffel, et al., "Exploring The Limits of Transfer Learning with A Unified Text-To-Text Transformer", In Journal of Computing Research Repository, Oct. 23, 2019, 52 Pages.

Raheja, et al., "Dialogue Act Classification with Context-Aware Self-Attention", In Proceedings of Annual Conference of the North American Chapter of the Association for Computational Linguistics: Human Language Technologies, Jun. 2, 2019, pp. 3727-3733.

Skodova, et al., "Discretion of Speech Units forthe Text Post-processing Phase of Automatic Transcription (in the Czech Language)", In Proceedings of International Conference on Text, Speech and Dialogue, Sep. 3, 2012, pp. 446-455.

Morgan, et al., "Automatically Detecting Action Items in Audio Meeting Recordings", In Proceedings of the 7th SIGdial Workshop on Discourse and Dialogue, Jul. 2009, pp. 96-103.

"International Search Report and Written Opinion Issued in PCT Application No. PCT/US21/025286", dated Jul. 27, 2021, 12 Pages.

Zhu, et al., End-to-End Abstractive Summarization for Meetings, In Repository of arXiv:2004.02016v1, Apr. 4, 2020, 12 Pages.

Banerjee, et al., "Generating Abstractive Summaries from Meeting Transcripts", In Repository of arXiv:1609.07033v1, Sep. 22, 2016, 10 Pages.

Ribeiro, et al., "Deep Dialog Act Recognition using Multiple Token, Segment, and Context Information Representations", In Journal of Artificial Intelligence Research, vol. 66, Nov. 30, 2019, pp. 861-899.

Schultz, Beth, "Otter.ai Has a Meeting Assistant for Your Team", Retrieved from: https://www.nojitter.com/ai-speech-technologies/otterai-has-meeting-assistant-your-team, Mar. 12, 2019, 04 Pages.

Shivakumar, et al., "Learning from Past Mistakes: Improving Automatic Speech Recognition Output via Noisy-Clean Phrase Context Modeling", In Journal of APSIPA Transactions on Signal and Information Processing, vol. 8, 2019, 16 Pages.

Shugrina, Maria, "Formatting Time-Aligned ASR Transcripts for Readability", In Proceedings Human Language Technologies: The Annual Conference of the North American Chapter of the Association for Computational Linguistics, Jun. 2, 2010, pp. 198-206.

Song, et al., "MASS: Masked Sequence to Sequence Pre-training for Language Generation", In Journal of Computing Research Repository, May 7, 2019, 11 Pages.

Szegedy, et al., "Rethinking the Inception Architecture for Computer Vision", In Proceedings of the IEEE Conference on Computer Vision and Pattern Recognition, Jun. 27, 2016, pp. 2818-2826.

Tajiri, et al., "Tense and Aspect Error Correction for ESL Learners Using Global Context", In Proceedings of the 50th Annual Meeting of the Association for Computational Linguistics, Jul. 8, 2012, pp. 198-202.

Tan, et al., "Neural Post-Editing Based on Quality Estimation", In Proceedings of the Conference on Machine Translation (WMT), vol. 2: Shared Task Papers, Sep. 7, 2017, pp. 655-660.

Tran, et al., "A Hierarchical Neural Model for Learning Sequences of Dialogue Acts", In Proceedings of the 15th Conference of the European Chapter of the Association for Computational Linguistics: vol. 1, Apr. 3, 2017, pp. 428-437.

Tur, et al., "The CALO Meeting Assistant System", In Journal of IEEE Transactions on Audio, Speech, and Language Processing, vol. 18, No. 6, Aug. 2010, pp. 1601-1611.

Vaswani, et al., "Attention Is All You Need", In Proceedings of the 31st Conference on Neural Information Processing Systems, Dec. 4, 2017, 11 Pages.

Wu, et al., "Google's Neural Machine Translation System: Bridging the Gap between Human and Machine Translation", In Journal of Computing Research Repository, Sep. 26, 2016, 23 Pages.

Xiong, et al., "The Microsoft 2017 Conversational Speech Recognition System", In Proceedings of IEEE International Conference on Acoustics, Speech and Signal Processing, Mar. 5, 2017, pp. 5255-5259.

Yang, et al., "XLNet: Generalized Autoregressive Pretraining for Language Understanding", In Journal of Computing Research Repository, Jun. 19, 2019, 18 Pages.

Yannakoudakis, et al., "A New Dataset and Method for Automatically Grading ESOL Texts", In Proceedings of the 49th Annual Meeting of the Association for Computational Linguistics, Jun. 19, 2011, pp. 180-189.

Zhang, et al., "Sequence-to-sequence Pre-training with Data Augmentation for Sentence Rewriting", In Journal of Computing Research Repository, Sep. 13, 2019, 11 Pages.

Zhao, et al., "Effective Incorporation of Speaker Information in Utterance Encoding in Dialog", In Journal of Computing Research Repository, Jul. 12, 2019, 09 Pages.

Liu, et al., "ProMETheus: An Intelligent Mobile Voice Meeting Minutes System", In Proceedings of the 15th EAI International Conference on Mobile and Ubiquitous Systems: Computing, Networking and Services, Nov. 5, 2018, pp. 392-401.

"International Search Report and Written Opinion Issued in PCT Application No. PCT/US21/023378", dated Jun. 4, 2021, 16 Pages.

"Non Final Office Action Issued in U.S. Appl. No. 16/884,410", dated Apr. 1, 2022, 18 Pages.

(56) References Cited

OTHER PUBLICATIONS

U.S. Appl. No. 16/884,410, filed May 27, 2020.
"Notice of Allowance Issued in U.S. Appl. No. 16/884,410", dated Sep. 8, 2022, 7 Pages.

* cited by examiner

AUTOMATED MEETING MINUTES GENERATOR

BACKGROUND

Meetings are a very common forum where people exchange ideas, make plans, and share information. With the ubiquity of automatic speech recognition systems come vast amounts of meeting transcripts. With the abundance of these automatically generated meeting transcriptions, meeting summarization, and other downstream operations, are of great importance to both the participants of the meetings and other parties interested in the meeting content. Because of the large volume of text included in the meeting transcripts, it is often difficult to sift through the content to find relevant information or get a general idea of the content of the meeting. Therefore, the need to succinctly summarize the content of a meeting naturally arises.

Several methods of generating summaries for meeting have been created. One non-computerized method includes assigning one participant of the meeting to manually keep meeting minutes notes and prepare a formalized summary from the meeting for use by the rest of the participants. Other methods of summarizing meetings include complex multi-step pipelines that make joint optimization intractable. There are also a handful of existing deep neural models for generating text summarization. However, existing systems for are not configured to handle the semantic structures and styles of meeting transcripts, which are quite different from transcriptions from articles and conversations. Existing systems are also not configured to extract content from meetings to train models for machine transcription and subsequent summarization.

There are several types of meeting summaries that can be created, including extractive summaries and abstractive summaries. Extractive summarization is the strategy of concatenating extracts taken from a corpus (i.e., meeting transcription) into a summary, while abstractive summarization involves paraphrasing the corpus using novel sentences. Abstractive summaries are often more readable and useful but present more challenges in achieving accurate summarization as compared to extractive summarization techniques.

For example, current abstractive summarization requires complicated multi-stage machine learning pipelines, such as template generation, sentence clustering, multi-sentence compression, candidate sentence generation, and ranking. As these approaches are not end-to-end optimizable, it is hard to jointly improve various parts in the pipeline to enhance the overall performance. Moreover, some components (e.g., template generation), require extensive human involvement, rendering the solution difficult to scale or transfer between systems.

Some systems have been configured to perform document summarization, such as pointer-generator networks, reinforced summarization networks, and memory networks. These deep learning methods can effectively generate abstractive document summaries by directly optimizing defined goals. However, existing systems are not able to perform the meeting summarization task which, in contrast to general document summarization, inherently bears a number of challenges that make it more difficult for end-to-end training than document summarization.

First, for example, a meeting is carried out between multiple participants, wherein each participant has a different role or contributive function in the meeting, different semantic styles, and other variable factors that affect the meeting transcription and downstream actions in the summarization pipeline. Thus, the different semantic styles, standpoints, and roles of each participant all contribute to the heterogeneous nature of the meeting transcript. Furthermore, it is often difficult to ascertain the identity of the speaker solely based on a meeting transcription and/or audio recording for the same reasons.

Second, the transcript and summary of a single meeting are usually much longer than those of a document. For instance, in some news articles and/or news transcriptions (i.e., common datasets used to train models on summarization processes), there are on average hundreds of tokens per article. In contrast, some meeting transcriptions contain thousands of tokens per transcript and hundreds of turns (i.e., changes between speakers). This poses a great challenge to the time and space efficiency of meeting summarization methods because as models trained on non-similar datasets (e.g., news content or other non-meeting sources) are used for meeting summarization, the summary output is not optimized for the length nor the structure of the meeting transcript.

A third challenge is that the structure of the meeting transcript is very distinct from other document formats, as a meeting usually progresses according to an agenda and according to defined goals (or goals that are defined during the concourse of the meeting), while other documents tend to have a general form including an introduction, several main paragraphs, and a conclusion.

Other challenges to summarization include the problem of error propagation from the initial transcription creation through to other downstream operations. Oftentimes, the speech service (e.g., automatic speech recognition (ASR) system and/or speech-to-text system) will transcribe the audio detected from the speakers (i.e., participants) of a meeting. However, the ASR system often will not correctly transcribe every word from every speaker, causing the transcription to include certain word errors which can be defined by a word error recognition (WER) percentage.

In some instances, the speakers themselves introduce errors into the transcription, wherein the manner in which the speakers expressed themselves produced grammatical and/or syntactic errors are included in the transcription, even if the transcription process did not introduce more errors. Both machine and human induced errors can be difficult to find and correct and therefore, can be propagated through to other operations performed on the transcript. For example, in some instances, a summary generated from a meeting transcript could include errors introduced by a speech-to-text translation and/or spoken errors. Such errors greatly decrease the ability of exiting systems to generate summaries or other products based on meeting content.

It is also noted, as alluded to earlier, that existing systems are not well configured to identify participants of a meeting, particularly those that are not previously associated with a known profiled, and to attribute content of the meeting to the different participants, especially the unknown participants.

Accordingly, there is an ongoing need for improved systems and methods for providing meeting transcriptions and for facilitating accurate and readable subsequent downstream operations with the transcribed meeting content, such as meeting summarizations, meeting minutes, outlines, as well as to identify meeting participants and to attribute meeting content to the different meeting participants, including unknown participants.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments are directed towards embodiments for automatically processing electronic content and for generating corresponding output. In some instances, the disclosed embodiments are also directed towards embodiments for automatically generating synthesized data (i.e., a summary and/or meeting minutes template) from electronic content obtained from a meeting.

The disclosed embodiments provide technical benefits over existing data processing techniques by providing new systems and methods for post-processing automatically created meeting transcripts, thereby improving the accuracy and readability of the transcript for subsequent downstream operations such as generating summaries and/or templates.

Some embodiments include methods and systems for generating a meeting output based on a post-processed meeting transcript. In these embodiments, a computing system identifies electronic content associated with a meeting. In some instances where the electronic content includes audio speech, an automatic speech recognition (ASR) model trained on speech-to-text data creates a transcription of the audio speech. The computing system, then, performs post-processing on the transcription to generate a post-processed transcription. In some instances, the transcription is post-processed by a machine learning model trained on post-processing training data for modifying text included in the transcription. The transcription is post-processed by both (1) modifying the a punctuation, grammar, or formatting of the transcription that was introduced by the ASR model during the transcription process and by (2) changing or omitting one or more words in the transcription which were included in both the audio speech and the transcription.

In some instances, the computing system also generates output based from the post-processed transcription, such as, for example, a meeting summary that is automatically created by a machine learning summarization model that summarizes the content of the post-processed transcription. Additionally, or alternatively, the output includes a template that is generated at least in part from the post-processed transcription. In some instances, the template is automatically populated based on tags identified in the original and/or post-processed transcription of the audio speech.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
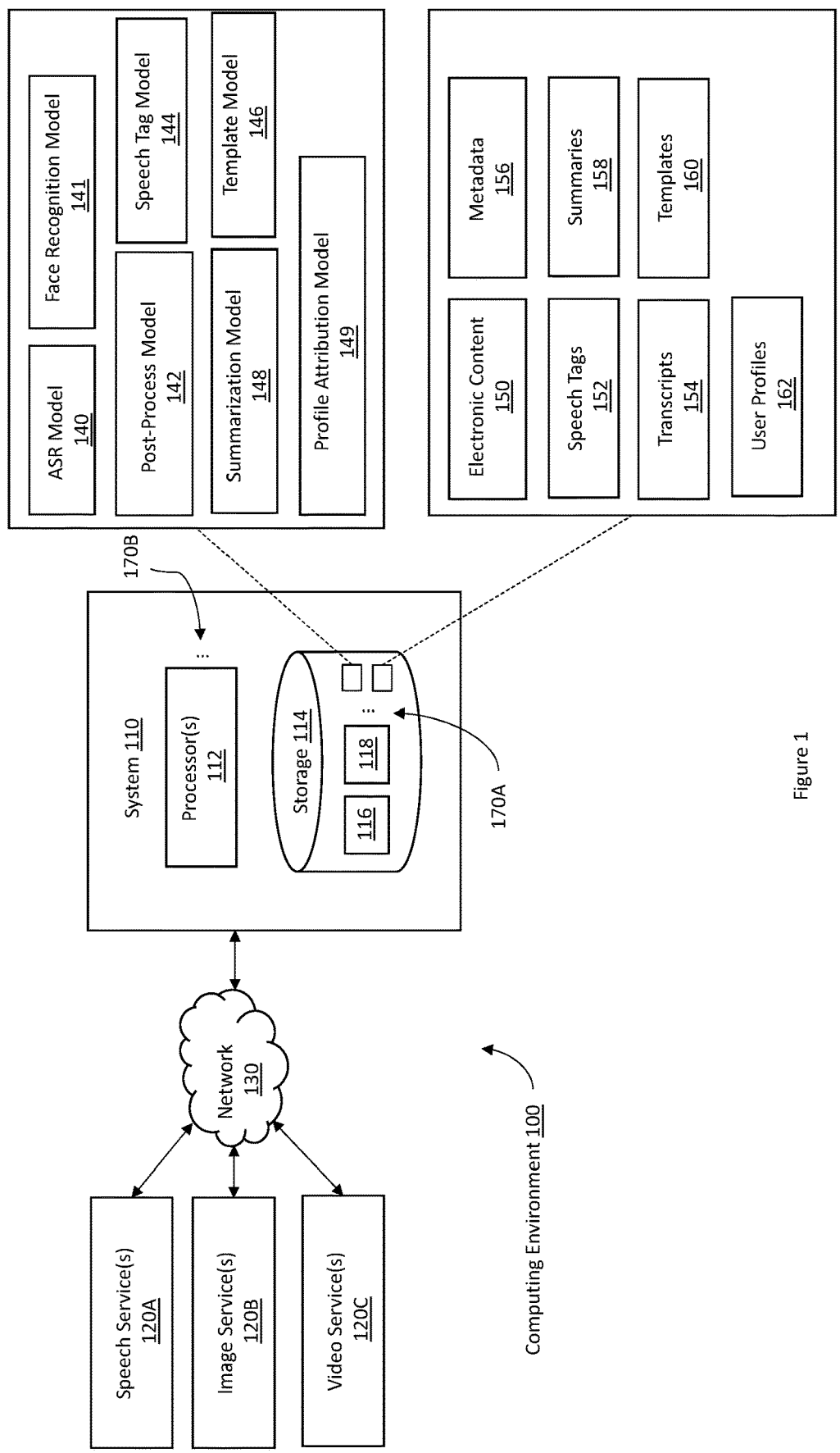
FIG. 1 illustrates a computing environment in which speech services are in communication with a computing system that is configured to transcribe and post-process electronic content and generate an output based on the post-processed electronic content.

Disclosed embodiments are directed towards embodiments for automatically processing electronic content and for generating corresponding output, wherein electronic content associated with a meeting is identified and audio speech detected in the electronic content is transcribed by an ASR model trained on speech-to-text data. The transcription of the electronic content is then post-processed by modifying text included in the transcription. Additionally, output based on the post-processed transcription is generated, such as, for example, a summary and/or a template for the meeting. Disclosed embodiments are also directed to a plurality of acts associated with computer-implemented methods for automatically processing electronic content and for generating corresponding output.

In some instances, the disclosed embodiments provide technical benefits over conventional systems and methods for automatically generating a meeting output (e.g., summaries, templates, etc.) by improving the readability and accuracy of a transcription of electronic content associated with a meeting. For example, during post-processing, the original transcription is modified by changing the punctuation, grammar, or formatting introduced by the ASR model during the transcription process. Notably, in some embodiments, the transcription is also modified by changing or omitting one or more words that were included in both the audio speech and the transcription (e.g., errors introduced by one or more of the participants).

Technical benefits of the disclosed embodiments also include facilitating the automatic generation of improved outputs of downstream operations performed on the transcriptions, including summaries generated by abstractive summarization techniques and/or automatically populated templates, for example. In some instances, the transcription beneficially includes speech tags identified in the electronic content and/or transcribed audio speech to facilitate the generation of improved meeting outputs.

Disclosed embodiments also include automatically processing electronic content and for attributing sub-portions of the electronic content to contributing entities.

In some instances, the disclosed embodiments provide technical benefits over conventional systems and methods for automatically attributing sub-portions of electronic content to contributing entities (i.e., contributors to or creators of the electronic content) associated with the electronic content by improving the accuracy and speed of identifying contributing entities by storing, in a known database, a plurality of user profiles corresponding to one or more contributing entities. Furthermore, in some instances, if a contributing entity is not recognized in the known database, the sub-portion will be attributed to a guest user profile, wherein the guest user profile can be later tagged with the correct identity of the contributing entity associated with the sub-portion of electronic content.

Technical benefits of the disclosed embodiments also include facilitating the automatic generation of improved outputs of downstream operations performed on the electronic content and user profiles, including the creation of transcriptions of the electronic content, summaries generated by abstractive summarization techniques and/or automatically populated templates, for example. In some instances, the transcription beneficially includes metadata obtained from one or more user profiles in the electronic content and/or transcribed audio speech to facilitate the generation of improved meeting outputs from the transcription. In some embodiments, the meeting output is a generated guest user profile or one or more updated stored user profiles.

Additional benefits and functionality of the disclosed embodiments will be described below, including the processing and post-processing of electronic content, as well as the generation of output based on the processed and/or post-processed electronic content.

Figure 2:
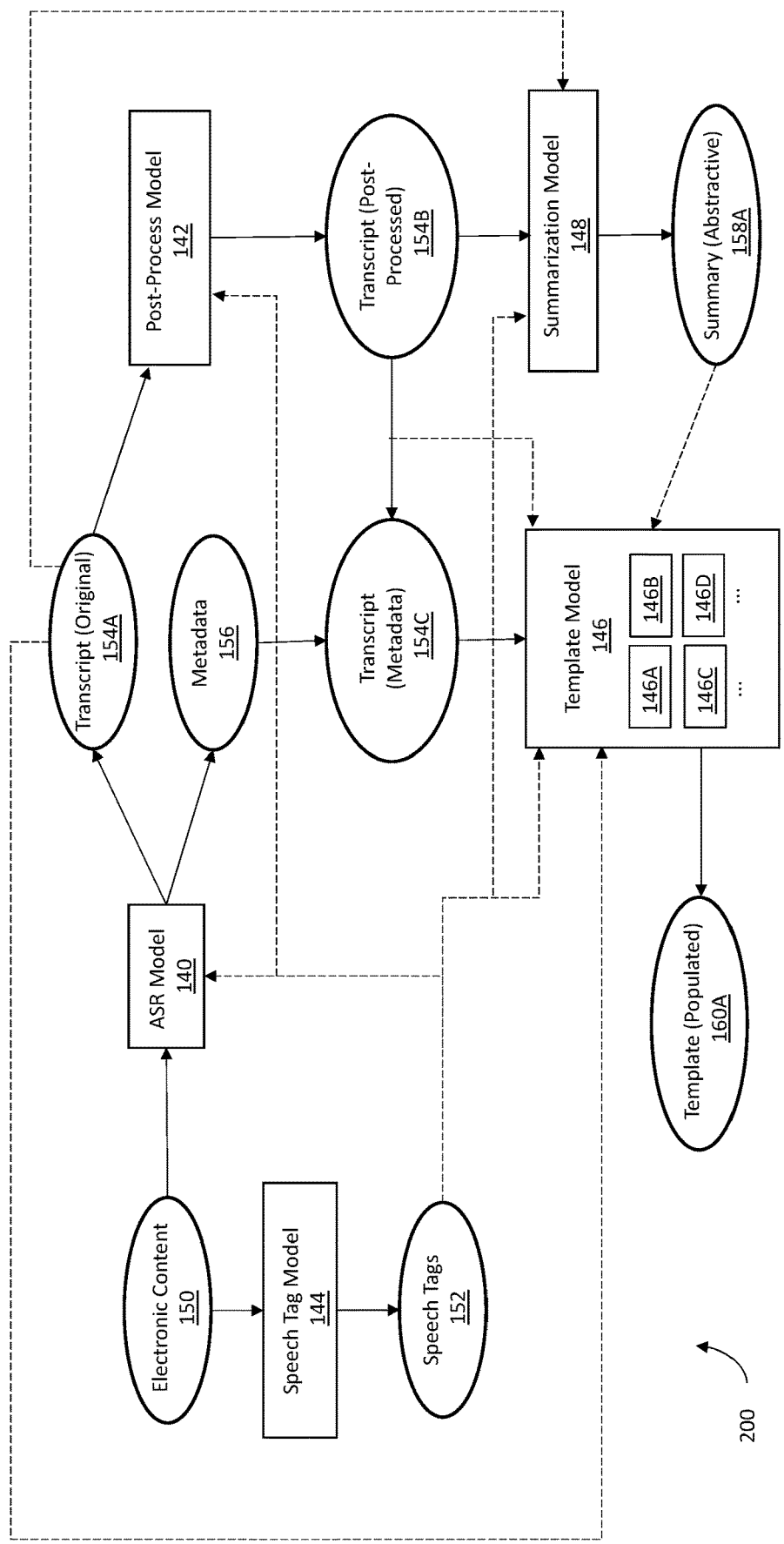
FIG. 2 illustrates one embodiment of a process flow diagram of a computing system configured to include and/or implement aspects of the disclosed embodiments.

Attention will now be directed to FIGS. 1 and 2, which illustrate corresponding components of a computing system 110 which may include and/or be used to implement aspects of the disclosed invention. As shown, the computing system includes a plurality of machine learning models and data types associated with inputs and outputs of the machine learning models.

Attention will be first directed to FIG. 1, which illustrates the computing system 110 as part of a computing environment 100 that also includes speech service(s) 120A, image service(s) 120B, and video service(s) 120C in communication (via a network 150) with the computing system 110. The computing system 110 is configured to transcribe and post-process electronic content and to generate an output based on the post-processed electronic content, as described throughout this disclosure. The computing system 110 is also configured to attribute electronic content to one or more contributing entities associated with the electronic content.

The computing system 110, for example, includes one or more processor(s) 112 and a storage 114 (i.e., hardware storage device) storing computer-executable instructions (see executable components 116 and 118), wherein ellipses " . . . " 170A indicate that the storage 114 is able to house any number of computer-executable instructions by which the computing system 110 is configured to implement one or more aspects of the disclosed embodiments when the computer-executable instructions are executed by the one or more processor(s) 112.

The storage 114 is shown as a single storage unit. However, it will be appreciated that the storage 114 is, in some embodiments, a distributed storage that is distributed to several separate and sometimes remote systems. The system 110 can also comprise a distributed system, in some embodiments, with one or more of the system 110 components being maintained/run by different discrete systems that are remote from each other and that each perform different tasks. In some instances, a plurality of distributed systems performs similar and/or shared tasks for implementing the disclosed functionality, such as in a distributed cloud environment.

The storage 114 is presently shown as storing a plurality of machine learning models and/or engines. For example, computing system 110 comprises one or more of the following: ASR model 140, face recognition model 141, post-process model 142, speech tag model 144, template model 146, summarization model 148, or profile attribution model 149 which are configured to implement the different functionality described herein.

In some instances, the storage 114 includes computer-executable instructions for instantiating or executing one or more of the models shown in computing system 110. In some instances, the one or more models are configured as machine learning models or machine learned models. In some instances, the one or more models are configured as deep learning models and/or algorithms. In some instances, the one or more models are configured as engines or processing systems (e.g., computing systems integrated within computing system 110), wherein each engine (i.e., model) comprises one or more processors and corresponding computer-executable instructions.

For example, in some instances, the ASR model 140 is configured as a speech recognition engine configured to identify electronic content including audible speech, isolate audible speech from other noise and/or data, understand the speech, and apply accurate labeling to the speech data (e.g., generate a transcription matching the spoken words recorded from or being recorded during a meeting).

Because meetings generally include a plurality of speakers having different tones, semantic styles, and roles, the ASR model 140 is trained to be speaker independent while yielding a low word error recognition (WER) percentage. In some embodiments, the ASR model 140 is trained (i.e., adapted with corresponding training data) to frequently recorded speakers to improve the accuracy of the transcription. In some instances, this includes adapting/training the model based on content of each individual speaker's audio data, as well as the acoustic features of the audio speech pertaining to one or more particular speakers.

In some embodiments, the acoustic features are used to generate and/or update a meeting voice profile for the corresponding speaker, wherein the meeting voice profile can be matched to a saved voice profile included in a user profile corresponding to the speaker. This is beneficial when the computing system is determining to which user profile a certain audio recording should be attributed. For example, if the acoustic features of the audio recording match one or more of the acoustic features of the voice profile of the user profile, the probability that the audio recording corresponds to that user profile is increased.

In some instances, one or more of the models are integrated and/or combined such that a single model is configured to implement a plurality of aspects of the disclosed embodiments. For example, in some embodiments, the ASR model 140 is also configured to perform speech tagging techniques embodied by the speech tag model 144. In some embodiments, the ASR model 140 is integrated with one or more speech services 120 to detect audio speech from a meeting and transcribe the audio speech. In some embodiments, the speech tag model 144 is integrated with the speech services 120 and/or the ASR model 140, wherein the speech services 120 provide metadata to the ASR model corresponding to highlighted (i.e., tagged) portions of the electronic content 150 and/or transcription (e.g., transcripts 154).

For example, in some instances, the face recognition model 141 is configured as a face recognition engine configured to identify electronic content including video and/or image data obtained during or from a meeting, isolate frames of the video and/or image data, and accurately associate the data to a particular entity (i.e., a participant of the meeting) included in the electronic content. More specifically, the face recognition model 141 is configured to detect and/or identify one or more human faces from a captured image or video frame.

In some embodiments, the face recognition model 141 recognizes facial features such as hair color, skin color, eye color, face shape and dimensions, facial contour, height, pre-determined multi-point reference structure, or other feature to facilitate the detection and/or identification of a face of a particular contributing entity or speaker.

Because meetings generally include a plurality of participants having different styles, appearances, characteristics, and even changing characteristics over time from meeting to meeting, the face recognition model 141 is trained to be participant independent in some instances.

In some embodiments, the face recognition model 141 is trained (i.e., adapted with corresponding training data) to frequently recorded participants to improve the accuracy of the user profile attribution. In some instances, this includes adapting/training the model based on content of each individual participants video and/or image data, as well as the visual features pertaining to one or more particular participants.

In addition to a plurality of machine learning models, algorithms, and engines, the computing system 110, for example, the storage 114 of the computing system 110, is shown housing a plurality of data types utilized by or generated by the machine learning models, including electronic content 150 (e.g., electronic content obtained via the speech service(s) 120, speech tags 152 (e.g., speech tags identified and/or stored by the speech tag model 144), transcripts 154 (e.g., automatically created transcripts by ASR model 140 and/or post-processed transcripts generated by post-process model 142), metadata 156 associated with the electronic content 150 and/or other data types, summaries 158 (e.g., summaries authored by meeting participants and/or summaries generated by the computing system, for example by summarization model 148), and templates 160 (e.g., templates generated and/or automatically populated by template model 146).

Additionally, in some embodiments, the stored data types may also include user profiles (i.e., known, stored and/or guest user profiles corresponding to contributing entities that are associated with the electronic content.

In some instances, the electronic content 150 also includes training data for training and/or evaluating one or more of the plurality of models associated with computing system 110.

Post-Processing

In some embodiments, a post-process model 142 is configured to perform downstream processing (i.e., editing, modification) to the meeting transcripts 154. In some embodiments, post-processing includes actions to improve the accuracy of the meeting transcription based on the full context of the electronic content, domain knowledge, human knowledge, and other information. Additionally, post-processing includes action taken to enhance the readability of the meeting transcription.

One aspect of the post-processing system is to generate more readable, user-friendly sentences given the audio and recognition outputs from the ASR engines. Some metrics to evaluate the readability of text from different dimensions include, for example, one or more of the following: syntactic correctness, semantic closeness, fluency, or style. In some embodiments, these metrics will be also used to guide the manual labelling for data collection and automatic evaluation of the systems. Readability is also directed to a style transfer from a spoken language (from a speaker's audio stream) to a written language (beneficial for meeting transcripts). Spoken language refers to spontaneous speech that does not naturally follow normal grammatical conventions. Additionally, readability includes proper segmentation, capitalization, fluency, and/or grammar, as well as properly formatted dates, times, names, locations, and/or other numerical entities.

In some embodiments, post-processing includes modifications based on white lists, blacklists and/or the removal or replacement of hesitation words (e.g. um, uh) and repeated phrases removal, grammar error correction. In some embodiments, a sequence to sequence (seq2seq) system is used to generate more diversified sentences, followed by the ranking system to rank the output in terms of various metrics (e.g. readability, accuracy) and/or other metrics (WER, BLEU, MaxMatch, and/or GLEU).

In some embodiments, the WER metric is configured as a readability-aware WER (RA-WER) by removing the text normalization before calculating Levenshtein distance. All mismatches due to grammatical mistakes, disfluency, as well as improper formats of capitalization, punctuation, and written numerical entity are treated as errors. If there are alternative references, the closest one to the candidate is selected. Metrics are specific to the speech recognition task, the machine translation task, and grammar error correction task, among other tasks.

In some embodiments, the post-processing systems and methods are directed to the idea of "understanding then rewriting" as a new NLP task to provide conversion from raw ASR transcripts to error-free and highly readable text. In this solution, error correction and readability improvements will be performed in a single step.

Traditional ASR post-processing methods offer improvements in readability; however, there are two important shortcomings, as follows. (1) Since the whole process is divided into several sub-processes, the mistakes in the previous steps will accumulate. For example, in the sentence, "Mary had a little lamb. It's fleece was white as snow.", if in the punctuation step, a period '.' is added after the word "had," the rule-based capitalization will capitalize the word 'a.' (2) The traditional methods tend to transcribe the speech verbatim while ignoring the readability of the output text. It cannot detect and correct disfluency in spontaneous speech transcripts. For example, in an utterance such as "I want a flight ticket to Boston, uh, I mean to Denver on Friday", the speaker means to communicate "I want a flight ticket to Denver on Friday." The segment "to Boston, uh, I mean" in the transcript is not useful for interpreting the intent of the sentence and hinders human readability and the performance of many downstream tasks. The inclusion of these words in the transcription increases the cognitive load to the reader, whether that reader is an automated machine reader or a human reader.

According to the disclosed embodiments, the post-processing model (e.g., post-process model 142) is configured to automatically and beneficially modify the original transcription by removing the segment "to Boston, uh, I mean," thereby increasing the overall readability of the transcription and decreasing the computational load associated with post-processing of the transcript.

In some embodiments, a baseline setup is used as the post-processing model including the production 2-step post-processing pipe of a speech recognition system, namely n-best language model (LM) rescoring followed by inverse text normalization (ITN). In some embodiments, other models (e.g., MASS, UniLM, RoBERTa, RoBERTa-UniLM and/or other models) are adapted to the post-processing task of increasing readability for a machine and/or human reader and overall accuracy of the transcription.

Disclosed embodiments are also directed to systems and methods for building a pipeline to evaluate the performance of the post-processing system, including creating datasets and metrics. In some embodiments, the post-processing system is configured as offline and/or online processing. Due to the lack of relevant data, we constructed a dataset for the APR task using a GEC dataset as seed data. The GEC dataset is composed of pairs of grammatically incorrect sentences and corresponding sentences corrected by a human annotator. First, a text-to-speech (TTS) system converts the ungrammatical sentences to speech. Then, an ASR system transcribes the TTS output. Finally, the output of the ASR system and the original grammatical sentences are used to create the data pairs.

In some embodiments, post-processing also refers to actions taken to enrich the meeting transcription such as automatic summarization, extraction of keywords, topics, entities, as well as enriching the content with externally obtained metadata such as knowledge graphs and organizational people graphs that describe the hierarchal relationship and duties between meeting participants. Additionally, or alternatively, the seq2seq system is used to incorporate external knowledge (e.g. attendee names, project names) and full context with the electronic content, audio stream, and/or meeting transcript. In some instances, the inclusion of external knowledge is performed via bias vectors. In some embodiments, external knowledge includes attendee names, project names, project deadlines, project locations, meeting locations, organizational structure, and/or other relevant information. In some embodiments, the transcription is embedded with links to content (e.g., meeting documents, emails, directions, user accounts, etc.) related to the meeting but external to the transcription based on the audio speech recognized by the ASR model.

From the extracted information and/or added external knowledge, the system is able to generate summarization for each individual participant and/or the whole group. Additionally, the system is configured to generate follow-up items, action items, with associated parties and deadlines based on the data enriching post-processing. In some embodiments, summarization across multiple related meetings is also generated.

Additionally, or alternatively, the post-processing also refers to actions taken to facilitate the retrieval of information from the audio speech and corresponding transcription. For example, in some instances, the meeting transcript is modified to be searchable content, searchable by keywords, attendees, entities, and/or topics. In some instances, the audio speech and/or transcription is configured for conversational question and answer (QnA) functionality. In this manner, a user is provided a functionality for searching across meetings. Conversational QnA will incorporate a search function to narrow down the reader's (machine or human) reader's focus to a few paragraphs in order to increase the speed of finding a relevant answer to the question searched.

The disclosed embodiments for the post-processing model herein are therefore directed to a novel natural language processing (NLP) task for ASR post-processing to improve readability. This post-processing transforms the noisy ASR output into readable text for humans and downstream tasks, while maintaining the semantic meaning of the speaker. Noise, in this regard, is characterized by syntactic and grammatical errors, disfluency, informal words, background noise incorrectly detected as speech, and other features that make the transcription difficult to understand.

The disclosed embodiments are also directed to methods to address the lack of task-specific data by synthesizing examples for the post-processing task, including the use of text-to-speech (TTS) data and grammatical error correction (GEC) data.

Speech Tagging

In some embodiments, the speech tag model 144 is performed to provide a way for a user (i.e., speaker, meeting participant, etc.) and/or a system to highlight important parts of the electronic content obtained from a meeting (e.g., speech tags included with recorded audio data and/or transcription of the audio). In some embodiments, the speech tags are attributed to a particular speaker (i.e., contributing entity) via the profile attribution model 141 (see FIG. 6).

As shown in FIGS. 1 and 2, a speech tag model 144 is provided for use in and/or for the computing system 110 and is configured to identify spoken keywords in the audio speech of the electronic content 150 obtained from a meeting. For example, given an utterance wherein a user asks (i.e., gives a speech command) to an AI assistant to take a note (i.e., highlight) what the user will say next, the computing system 110 detects keywords, understands the note type, and identifies the content. Identified keywords trigger the computing system to insert speech tags 152 as metadata 156 into the electronic content 150 and/or transcription (e.g., original transcript 154A of FIG. 2).

For example, an initial or starting keyword (or keyword phrase) is pre-defined and detectable by the speech tag model 144, wherein the speech tag model 144 recognizes a starting index for a new portion of the electronic content and/or associated transcription. In some instances, an ending keyword (or keyword phrase) is also pre-defined wherein the speech tag model 144 recognizes an ending or closing index for the highlighted portion of the electronic content and/or associated transcription.

For example, a user speaks "Hi Princeton" (i.e., starting keyword phrase) to indicate a start of a speech tag, and speaks "That's it" (i.e., ending keyword phrase) to indicate an end of the speech tag. A user then can say "Hi Princeton, take a note on a follow up action: upload the design document to Teams. That's it." The speech tag model 144 will detect and recognize the starting keyword phrase "Hi Princeton" and recognize the ending keyword phrase "That's it." Once the boundaries of the highlighted portion (e.g., speech tag 152) are defined, the note type is understood (e.g., "follow up action") wherein the speech tag 152 is determined to correspond to a special meaning of the speech content (e.g., a follow up action, a to-do list, open issues, resolved issues, summary points). Then, the content of the speech tag is determined (e.g., "upload the design document to Teams").

In some embodiments, the speech tag 152 includes corresponding metadata associated with attributes/features detected for the tagged content, including, for example, an assignment to a responsible party (e.g., a team member responsible for completing a task), assignment to an assignment party (i.e., the person identifying a task and/or person to whom the responsible party should report a status of the task), an assignor, content that is discovered by the system as being associated with the task and that can be linked to the task, a deadline associated with the task, and/or other relevant information.

In some embodiments, the attributes/features are used by the profile attribution model 141 to update a user profile 162 with the tagged content. For example, a user profile 162 can include a speech tag 152 that they spoke and/or a user profile 162 can include a speech tag 152 including content that is related to them (e.g., an assignment and/or deadline).

In another example, the user defines the keywords as custom phrases, wherein the starting keyword is "Hi Denmark" and the ending keyword is "Done Denmark" to vocally indicate the start and end of a portion of the transcription (e.g., transcript 154) that the user desires to highlight and/or assign a level of importance. In some instances, the speech tag model 144 is deployed on a speech-enabled device implementing a one or more speech services (e.g., speech service(s) 120).

In some embodiments, a computing system (e.g., computing system 110) provides a user with a user interface, wherein a user customizes definitions for the start and end parts of the speech tag. Through the user interface, a user records a few examples of the keywords (and/or keyword phrases) for the starting tag and ending tag.

A speech recognition engine (e.g., ASR model 140) is used to decode the examples via a beam search to estimate the labels of the keyword (i.e., possible text transcriptions corresponding to the spoken keywords). The algorithm (i.e., speech recognition engine) maintains an N-best list of label sequence hypotheses, along with a confidence for each hypothesis, in order to minimize the error that will be incurred by incorrectly estimating the labels. The labels include one or more of the following: phonemes, graphemes, or other linguistic subunits. The algorithm loops (i.e., repeats) for both the starting tag and the ending tag of the speech tag to obtain a start tag model and an end tag model for the use of speech tag triggering during inference (i.e., during streaming speech).

At inference time, a voice activity detector (VAD) is used to determine which frames of the electronic content (e.g., electronic content 150) include speech audio. Frames including speech audio are sent to an ASR model (e.g., ASR model 140) and/or a speech tag model (e.g., speech tag model 144). For each segment of speech, a recognition score is calculated, the score indicating the probability of a confidence score of the speech recognition engine output (i.e., how likely the segment includes speech and/or the likelihood the ASR model correctly understood and applied labels corresponding to parts of the speech segment).

In some embodiments, the ASR model also extracts audio features of the frames that include audio speech to determine the identity of the speaker associated with the audio speech. For example, the acoustic features of the audio speech can be matched to a known user profile or associated with a guest profile. In such instances, the corresponding audio speech and speech tag will be mapped/attributed to the known user profile and/or guest profile.

To calculate and obtain speech tag scores, each hypothesis in the tag models (e.g., a start tag model and/or an end tag model) is scored using a forward algorithm, wherein the hypothesis scores are aggregated to obtain a single detection score for start and end tags, respectively. If a detection score exceeds a pre-determined confidence threshold, the computing system (e.g., computing system 110) is triggered to identify and catalog individual speech tags.

In some instances, the confidence threshold is manually tuned. Additionally, or alternatively, the confidence threshold is machine-learned. To initiate a triggered state of speech tagging, a final determination of whether a tagging keyword is detected is made by a rule-based and/or machine-learned model based on (1) the relative values of the speech recognition confidence scores and/or speech tag confidence scores, (2) based on a rule that the start tag must occur (i.e., be detected) before the end tag, (3) based on a rule that there is a time-out or time-space between the start and end tags, and/or (4) based on the allowance and/or correction of user input errors such as repeated tags or unclosed tags.

Once the speech tags (e.g., a starting keyword and an ending keyword) are detected, the transcript or content between the tags is extracted for subsequent processing (e.g., note classification and content span detection). In some embodiments, note classification and content span detection are performed by a deep learning model configured with multi-task learning. For example, the model comprises two task-specific head layers, wherein one layer is an individual sentence or sentence-pair classification head, while the other layer is a is token classification head.

It is noted that a sentence typically comprises a plurality of tokens. For instances in which there is an accessible database (i.e., list) of predefined note classes, the individual sentence classification is used. For cases involving custom note types, a system administrator is able to define a list of note types with corresponding descriptions and examples. In such embodiments, a sentence-pair classification head is used in the neural network to predict to which custom note the transcript corresponds.

The token classification head is used to predict the start and end position of the note span in the transcript. Pretrained language models, or encoders, are used to provide meaningful generalization ability. Specifically, the task-specific head layers are configured to be "on top" of the pretrained layers. In some embodiments, the entire neural network is fine-tuned (i.e., trained) on supervised task-specific data, wherein supervised training comprises validated ground truth training data (e.g., human labels). In the case that any of the classification output is invalid (e.g., undetectable note type and/or misclassified note type), the triggering of the speech tagging is identified as a false accept (i.e., false alarm) and the computing system ignores the previously detected speech tag.

It will be appreciated that, in some instances, speech tagging will be performed during and/or after the meeting from which the electronic content is being obtained in order to highlight important phrases and/or portions of the electronic content. The disclosed embodiments beneficially include speech tagging functionality as a novel mechanism to insert structured semantics into a speech stream (e.g., electronic content 150) and/or into metadata 156 corresponding to a transcript 154, thus facilitating an improvement in downstream processing to easily and quickly separate highlighted content from non-highlighted content.

In some instances, the highlighted portions will be used to facilitate the generation of meeting minutes (e.g., transcript-based output such as a summary and/or template) after the meeting. In such embodiments, rule-based and/or neural network models are used to analyze the content of the speech tags 152 and the corresponding highlighted portions of the transcription to generate a structured summary 158 and/or automatically populate a template 160. The rule-based and neural network models help to make the inclusion of a speech tag 152 more natural during speech (i.e., naturally embedded as part of typical sentences heard in meetings). The speech tag 152 is also more flexible for use in downstream processing (i.e., post-processing) and simultaneously keep semantics more accurate throughout the downstream processing and corresponding outputs.

In some embodiments, the system also searches local and/or remote databases for content that is related to the detected speech terms, tasks, dates and/or relevant parties, to link the related content to the tags and/or with the tags as metadata for the tags.

Figure 10:
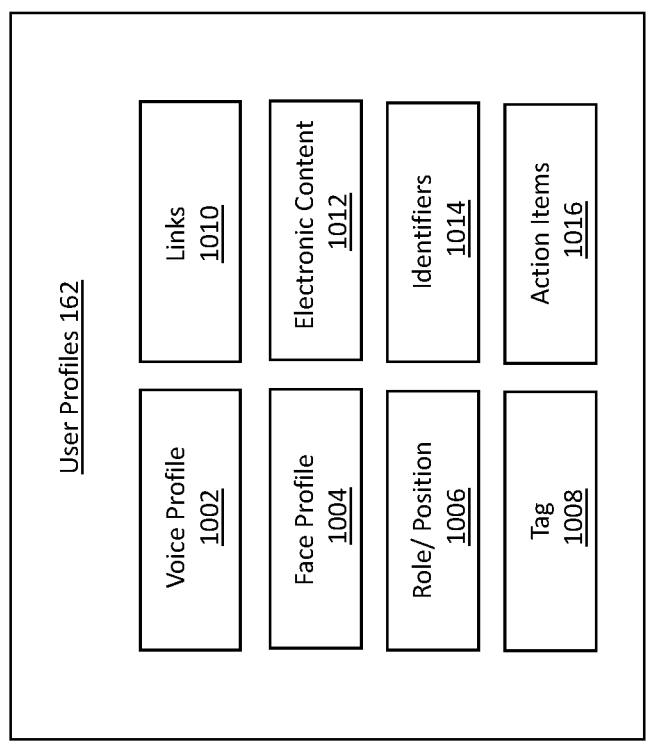
FIG. 10 illustrates an example embodiment of electronic content included in the user profiles referenced in FIG. 1.

In some embodiments, the databases include a database of user profiles 162 including information about the user (see also FIG. 10). These user profiles 162 may be specific to particular people and may include particular personal attributes associated with those particular people. In some instances, the user profiles 162 may also include one or more generic guest profiles (e.g., a guest profile having particular/predetermined guest attributes).

In some embodiments, the downstream processing is performed by a summarization model 148 configured to generate an abstractive summary of the transcription of the meeting. The summarization model 148 is described in further detail in reference to FIGS. 4 and 5. Additionally, or alternatively, the downstream processing is performed by a template model 146 configured to generate a plurality of templates and/or automatically populate one or more of the generated templates as a meeting output.

Meeting Minutes Templates

As shown in FIGS. 1 and 2, computing system 110 also comprises a template model 146 configured to generate and/or automatically populate a template corresponding to a structured outline of input fields associated with a particular source of electronic content (e.g., a particular meeting type and/or corresponding transcript), based on content detected in the transcript and/or based on linked/related content.

In some embodiments, the template model 146 automatically generates a plurality of templates (e.g., templates 146A, 146B, 146C, 146D), and/or automatically selects a particular template from the plurality of templates, based on a plurality of meeting types and/or user preferences and further based on content identified in the meeting transcript and/or based on the tags.

In some embodiments, the user preferences are learned over time by a deep learning network associated with the template model 146. Then, from the plurality of templates, one or more templates is automatically selected and automatically populated with information extracted from the post-processed transcription of the meeting's electronic content and/or other information that is linked with the one or more tags.

In some embodiments, the output generated from the post-processed meeting transcription (e.g., by a template model) are structured meeting notes configured as a meeting minutes template so that users will quickly and easily know what was discussed during the meeting, what was accomplished, and what remains to be done. The template provides a format wherein the outcomes, and group and personal action items are easily accessible by meeting participants and/or third parties interested in the meeting content.

The template version of the meeting minutes will expose important meeting information via an extensible template (e.g., defined in an XML file). Much of the data will be intelligently auto populated using information from the transcript, meeting audio, and meeting metadata, including metadata extracted from speech tags. In later phases, the Meeting Minutes service will consume additional inputs from the Office graph and other external information. For accessibility, and to improve remote meetings, the chat logs for a given meeting are incorporated as an input.

In some embodiments, the template includes elements that can be modified by users. Ensuring that edits can flow back to the service is vital for continuous learning. It should be appreciated that the order, presentation, and subset of the template items vary depending on the industry, the organization's admin settings, the meeting administrator's settings, or the type of meeting (classified). Due to the current state of related technologies, ins some embodiments, certain categories will be supervised via pre-configured meeting commands, e.g., "Hey Princeton, assign an action item to Will to schedule a meeting with Cindy before next Friday." (See speech tagging above).

Several examples of a skeleton/template of a meeting minutes are presented below. Depending on user/designer input, certain elements will be editable, purely navigational, and/or only visible to certain users (e.g. certain analytics). Certain items such as the additional media may be solely populated via user uploads. In some embodiments, one or more templates are generated based on a meeting type classification (e.g., working meetings, team/project meetings, one-on-one meetings, staff meetings, management meetings, kickoff meetings, committee meetings, stand-up meetings, townhalls, steering committees, negotiations, performance reviews, and/or status update meetings).

Working meetings are meetings where people take time to work on something together. These are characteristic of medium or large organizations and span all meeting sizes. Collaboration, disagreement, and tangents are common in these meetings. Information flow tends to be distributed amongst attendees rather than coming from a single source. Common forms of working meetings include brainstorming, problem-solving, decision making, and issue resolution. Therefore, an overview of important information included with meeting minutes beneficially includes a focus on personal action items, team action items, next steps (e.g., next meetings, follow-up discussions), and outcomes (e.g., actions taken during the meetings, decisions, results of votes, etc.). Context for the meeting minutes includes the time and data of the meeting, list of attendees, files shared at or leading up to the meeting. Secondary information is also included in some embodiments such as additional private and/or public notes, whiteboard notes, and/or highlighted sections (i.e., pinned or tagged portions).

Team/project meetings are similar to working meetings but focus more on a project's "status." A meeting minutes template therefore beneficially focuses on who is working on what assignment and the status of individual and/or collective task. Outcomes are characterized by decisions made and/or issues blocking the completion of the task.

One-on-one meetings tend to occur between a manager and their employees, though may also occur between two or more parties. Often these meetings are centered around career development, so the focus of a template may further be directed to deadlines and priority adjustments that should be made and a sense of progress from previous meetings and/or across an individual's career.

Staff meetings are also similar to working meetings but generally are defined by the transmission of information from one (or a select few) participants to a large volume of participants. In some embodiments, templates generated and populated for staff meetings beneficially include custom executive summaries and agenda items based on salient information for a particular reader (e.g., different departments of a company receive different content relating to their specific goals and tasks). In some embodiments, the customized features are based on preferences stored in associated with the user profile corresponding to the particular reader, wherein the user profile includes information about their specific goals, tasks, organizational function, role, etc.

Here are a few non-limiting examples of meeting templates that can be automatically generated, selected and/or populated, as described:

Example 1: Generic Meeting Minutes Template

I. Meeting Metadata
   a. Date and time
   b. Attendees (not invitees)
      i. (Optional) roles/affiliations of attendees if important for sector
   c. Subject
   d. Meeting ID
II. Executive Summary (abstractive)
   a. Description: A short (3-6 sentence) summary of the high-level content of the meeting. In most cases, this focuses on what the team discussed as a whole, without getting lost in the details. In some embodiments, a participant and/or group is associated with the summary, wherein the executive summary is customizable to what is more salient or informative to a particle reader.
   b. (Extended)—Summary generated for each participant.
III. Agenda/Verbose Summary—Nested list of items:
   a. Topic
   b. Content: series of key points formatted as participants or the whole group's contributions related to the topic.
   c. Associated Attendees
   d. Transcript IDs associated with the topic.
IV. Follow-up Actions
   a. (readable/abstractive) Action content
   b. Status
   c. Point(s) of contact (responsible) (In some examples, regarding a user interface or post-meeting email includes the primary reader's individual TO-DO list items first).
   d. Due Date
   e. Transcript IDs associated with the action
V. Key Words
   a. Word
   b. Links to Transcript IDs for navigation
VI. Next Steps(s)—(Mainly taken from metadata. Some could be inferred from NLU)
   a. Next Meetings(s)
      i. Date
      ii. Location
      iii. Subject
      iv. Tasks to address at the meeting (optional)
   b. Any Additional information
VII. Additional Notes, Comments, and Files (Perhaps a binding with existing Teams meeting notes content, but any place for people to be taking private and/or shared notes and linking to other content)
   a. Public notes—for additional shared comments
   b. Private notes—per user Example 2: Expanded Meeting Minutes Template I. Meeting Metadata
   a. Date and time
   b. Location (probably hidden in most scenarios)
   c. Invitees (probably hidden in most scenarios)
   d. Attendees (not invitees)
      i. (Optional) roles/affiliations of attendees if important for sector
   e. Subject
   f. Meeting ID
II. Executive Summary (abstractive)
   a. Description: A short (3-6 sentence) summary of the high-level content of the meeting. In most cases, this focuses on what the team discussed as a whole, without getting lost in the details.
   b. (Extended)—Summary generated for each participant.
III. Agenda/Verbose Summary—Nested list of items:
   a. Topic
   b. Content: series of key points formatted as participants or the whole group's contributions related to the topic. E.g.:
      i. Person A updated the group that s/he completed task X.
      ii. The group discussed whether to delay the release.
      iii. Person B voiced that the group needs to consider issue Y for this topic.
      iv. The group voted on this resolution.
      v. Etc.
   c. Associated Attendees
   d. Associated Entities
   e. Transcript IDs associated with the topic.
   f. Sub-topics
      i. Sub-topic
      ii. Sub-topic content
      iii. Etc.
IV. Follow-up Actions
   a. (readable) Action content
   b. Status
   c. Assigned by [nullable list]
   d. Point(s) of contact (responsible), or assigned to [list]
   e. Due Date f. Transcript IDs associated with the action
g. Linked projects
h. Linked topics
i. Other Links V. Decisions
 a. Content
 b. Linked agenda items (from above)

VI. Unresolved Items
 a. Content
 b. Linked agenda items (from above)

VII. Status updates/Progress
 a. Linked entities (project or task)
 b. Linked topics (from agenda)
 c. Status content
  i. Evaluation of progress
 d. Linked transcript IDs
 e. Links to similar status in previous meetings in series or of same type (visibility may be limited to relevant individuals)

VIII. Key Words
 a. Word
 b. Links to Transcript IDs for navigation

IX. Entities (could be subset of key words—Leverage Entity Linking Intelligence Service)
 a. Term
 b. Content (perhaps like search result cards on Bing)
 c. Links to Transcript IDs for navigation
 d. Links to associated topics
 e. Links to associated documents (URL to SharePoint/emails, etc.)

X. Highlights—(both automatically generated using hotspot or other detectors and manually pinned)
 a. Attendee(s)
 b. Transcript IDs XI. Post-processed transcript
 a. Transcript results after being re-processed to correct errors and improve readability XII. Additional Media
 a. Uploaded images/diagrams
 b. Linked documents/files
 c. Etc.

XIII. Meeting Analytics—extensible
 a. Proportion of meeting taken up by each participant's speech
 b. List of interrupts and overlapping speech
 c. Number of unresolved issues
 d. Subjective Meeting Success (documented from participants)
 e. Time per topic
 f. Quantity of off-topic items
 g. Personal feedback on contributions (e.g. use of filler words, inclusive language, etc.)
 h. Locations and proportion of meeting associated with "Hot Spots" (were participants are highly engaged or excited)
 i. Etc.

XIV. Next Steps(s)—(Mainly taken from metadata. Some could be inferred from NLU)
 a. Next Meetings(s)
  i. Date
  ii. Location
  iii. Subject
  iv. Tasks to address at the meeting (optional)
 b. Any Additional information XV. Additional Notes and Comments (Perhaps a binding with existing Teams meeting notes content, but any place for people to be taking private and/or shared notes and linking to other content)
 a. Public notes—for additional shared comments
 b. Private notes—per user Example 3: Working Meetings Template I. Meeting Metadata
 a. Date and time
 b. Attendees (not invitees)
  i. (Optional) roles/affiliations of attendees if important for sector
 c. Subject
 d. Meeting ID II. Executive Summary (abstractive)
 a. Description: A short (3-6 sentence) summary of the high-level content of the meeting. In most cases, this focuses on what the team discussed as a whole, without getting lost in the details.

III. Follow-up Actions—Categorized based on assigned to me and those for the whole group.
 a. (readable) Action content
 b. Status
 c. Point(s) of contact (person responsible—for personalized action items lists)
 d. Due Date (could be null)
 e. Transcript IDs associated with the action IV. Outcomes
 a. Decisions
  i. Content
  ii. Linked agenda items (from agenda)
 b. Unresolved Items
 i. Content
 ii. Linked agenda items (from agenda)

V. Highlights—(both automatically generated using hotspot or other detectors and manually pinned)
 a. Attendee(s)
 b. Transcript IDs VI. Additional Media—(Not auto-populated)
 a. Uploaded images/diagrams
 b. Linked documents
 c. Etc.

VII. Additional Notes and Comments (Not auto populated. A binding for users to take/share notes, follow-up after the meeting, etc.)
 a. Public notes—for additional shared comments
 b. Private notes—per user VIII. Next Meeting—(Mainly taken from metadata)
 a. Date
 b. Location
 c. Subject
 d. Tasks to address at the meeting (optional)

IX. Agenda/Verbose Summary—Nested list of items:
 a. Topic
 b. Content: series of key points formatted as participants or the whole group's contributions related to the topic. E.g.:
  i. Person A updated the group that s/he completed task X.
  ii. The group discussed whether to delay the release.
  iii. Person B voiced that the group needs to consider issue Y for this topic.
  iv. The group voted on this resolution.
  v. Etc.
 c. Associated Attendees
 d. Associated Entities
 e. Transcript IDs associated with the topic.

f. Sub-topics
  i. Sub-topic
  ii. Sub-topic content
  iii. Etc.
X. Additional Content
  a. Key Words
    i. Word
    ii. Links to Transcript IDs for navigation
  b. Entities (could be subset of key words)
    i. Term
    ii. Content (perhaps like search result cards on Bing)
    iii. Links to Transcript IDs for navigation
    iv. Links to associated topics
    v. Links to associated documents (URL to SharePoint/emails, etc.)
  c. Meeting Analytics—extensible
    i. Proportion of meeting taken up by each participant's speech
    ii. List of interrupts and overlapping speech
    iii. Number of unresolved issues
    iv. Subjective Meeting Success (documented from participants)
    v. Time per topic
    vi. Quantity of off-topic items
    vii. Personal feedback on contributions (e.g. use of filler words, inclusive language, etc.)
    viii. Etc.

Example 4: Team/Project Meeting Template

I. Meeting Metadata
  a. Date and time
  b. Subject
  c. Meeting ID
II. Executive Summary (abstractive)
  a. Description: A short (3-6 sentence) summary of the high-level content of the meeting. In most cases, this focuses on what the team discussed as a whole, without getting lost in the details.
III. Current Status—(can be hierarchical)
  a. Linked entities (project or task)
  b. Linked topics (from agenda)
  c. Status content
  d. Attendees
  e. Linked transcript IDs
IV. Follow-up Actions (team first, then personal, then others)
  a. (readable) Action content
  b. Status
  c. Point(s) of contact (responsible)
  d. Due Date
  e. Transcript IDs associated with the actions
V. Highlights—(both automatically generated using hotspot or other detectors and manually pinned)
  a. Attendee(s)
  b. Transcript IDs
VI. Additional Media—(Not auto-populated)
  a. Uploaded images/diagrams
  b. Linked documents
VII. Additional Notes and Comments
  a. Public notes—for additional shared comments
  b. Private notes—per user
VIII. Agenda/Verbose Summary—Nested list of items:
  a. Topic
  b. Content: series of key points formatted as participants or the whole group's contributions related to the topic. E.g.:
    i. Person A updated the group that s/he completed task X.
    ii. The group discussed whether to delay the release.
    iii. Person B voiced that the group needs to consider issue Y for this topic.
    iv. The group voted on this resolution.
    v. Etc.
  c. Associated Attendees
  d. Associated Entities
  e. Transcript IDs associated with the topic.
  f. Sub-topics
    i. Sub-topic
    ii. Sub-topic content
    iii. Etc.
IX. Additional Content
  a. Decisions
    i. Content
    ii. Linked agenda items (from above)
  b. Unresolved Items
    i. Content
    ii. Linked agenda items (from above)
  c. Key Words
    i. Word
    ii. Links to Transcript IDs for navigation
  d. Meeting Analytics—extensible
    i. Proportion of meeting taken up by each participant's speech
    ii. List of interrupts and overlapping speech
    iii. Number of unresolved issues
    iv. Subjective Meeting Success (documented from participants)
    v. Time per topic
    vi. Quantity of off-topic items
    vii. Personal feedback on contributions (e.g. use of filler words, inclusive language, etc.)
    viii. Etc.
  e. Entities (could be subset of key words)
    i. Term
    ii. Content (perhaps like search result cards on Bing)
    iii. Links to Transcript IDs for navigation
    iv. Links to associated topics
    v. Links to associated documents (URL to SharePoint/emails/uploaded files etc.)
  f. Next Meeting—(Mainly taken from metadata)
    i. Date
    ii. Location
    iii. Subject
    iv. Tasks to address at the meeting (optional)

Example 5: One-On-One Meeting Template

I. Meeting Metadata
  a. Date and time
  b. Subject
  c. Meeting ID
II. Executive Summary (abstractive)
  a. Description: A short (3-6 sentence) summary of the high-level content of the meeting. In most cases, this focuses on what the team discussed as a whole, without getting lost in the details.
III. Follow-up Actions (personal, then other)
  a. (readable) Action content
  b. Status
  c. Point(s) of contact (responsible)
  d. Due Date
  e. Transcript IDs associated with the actions IV. Agenda/Verbose Summary—Nested list of items:
   a. Topic
   b. Content: series of key points formatted as participants or the whole group's contributions related to the topic. E.g.:
      i. Person A updated the group that s/he completed task X.
      ii. We both discussed whether to delay the release.
      iii. Person B voiced that the group needs to consider issue Y for this topic.
      iv. Etc.
   c. Associated Attendees
   d. Associated Entities
   e. Transcript IDs associated with the topic.
   f. Sub-topics
      i. Sub-topic
      ii. Sub-topic content
      iii. Etc. . . .
V. Outcomes
   a. Decisions
      i. Content
      ii. Linked agenda items (from above)
   b. Unresolved Items
      i. Content
      ii. Linked agenda items (from above)
VI. Current Status/Progress—(can be hierarchal)
   a. Linked entities (project or task)
   b. Linked topics (from agenda)
   c. Status content
      i. Evaluation of progress
   d. Linked transcript IDs
   e. Links to similar status in previous meetings in series or of same type (Visibility can be restricted)
VII. Entities
   a. Term
   b. Content (perhaps like search result cards on Bing)
   c. Links to Transcript IDs for navigation
   d. Links to associated topics
   e. Links to associated documents (URL to SharePoint/emails/uploaded files etc.)
   f. Links to associated objects in previous meetings
VIII. Highlights—(both automatically generated using hot-spot or other detectors and manually pinned)
   a. Attendee(s)
   b. Transcript IDs
IX. Additional Media—(Not auto-populated)
   a. Uploaded images/diagrams
   b. Linked documents
X. Additional Notes and Comments
   a. Public notes—for additional shared comments
   b. Private notes—per user
XI. Additional Content
   a. Key Words
      i. Word
      ii. Links to Transcript IDs for navigation
   b. Meeting Analytics—extensible
      i. Proportion of meeting taken up by each participant's speech
      ii. List of interrupts and overlapping speech
      iii. Number of unresolved issues
      iv. Subjective Meeting Success (documented from participants)
      v. Time per topic
      vi. Quantity of off-topic items
      vii. Personal feedback on contributions (e.g. use of filler words, inclusive language, etc.)
      viii. Etc.
   c. Next Meeting—(Mainly taken from metadata)
      i. Date
      ii. Location
      iii. Subject
      iv. Tasks to address at the meeting (optional)

Profile Attribution

Figure 6:
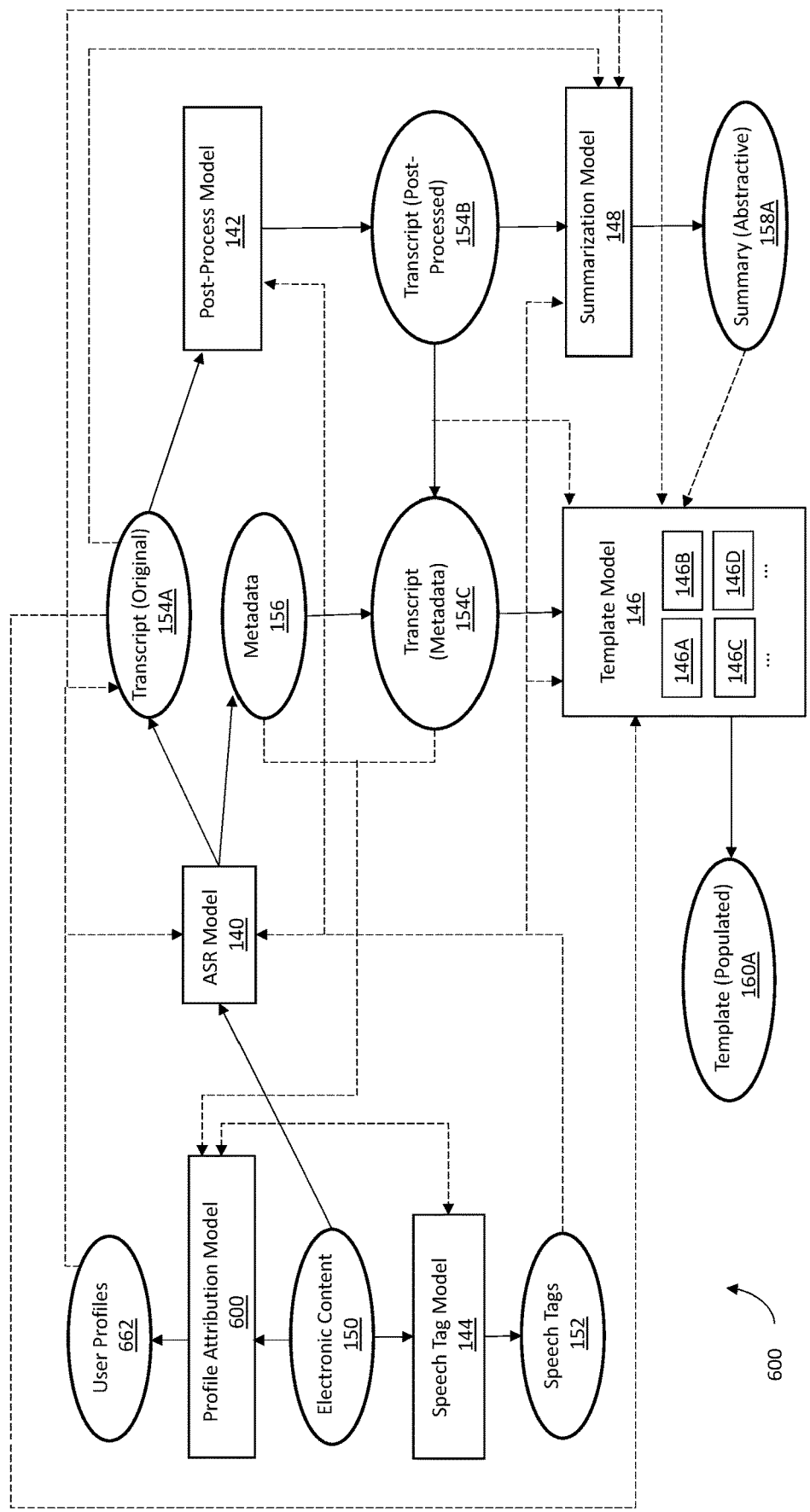
FIG. 6 illustrates one embodiment of a process flow diagram of a computing system configured to include and/or implement aspects of the disclosed embodiments, including attributing electronic content to a user profile.

As shown in FIGS. 1 and 6, the computing system 110 also includes a profile attribution model 149 and/or profile attribution model 600 configured to attribute electronic content obtained, for example, from a meeting to one or more meeting participants by storing the electronic content in association with one or more user profiles corresponding to the one or more meeting participants (i.e., contributing entities).

In some embodiments, with reference to FIG. 1, the profile attribution model 149 receives audio and visual data obtained via one or more of the speech service(s) 120A, image service(s) 120B, or video service(s) 120C. The video service(s) 120C are configured to record video and/or obtain a video stream from an event, for example, a meeting having one or more participants (i.e., contributing entities). The video service(s) 120C also include recording equipment such as video recorders and/or cameras having video recording capabilities.

The image service(s) 120B are configured to capture and record images of an even, such as a meeting, and also include equipment such as cameras. In some instances, the image services(s) 120B record images directly from the environment of the meeting. Additionally, or alternatively, the image service(s) capture image data (e.g., a frame) from video data recorded by the video service(s) 120C. The computing system 110 obtains data from one or more of these services via the network 130 and is able to store the data in the storage 114 via the profile attribution model 149 and/or other models that are able to access and process the data (i.e., electronic content).

The profile attribution model 149 is also associated with the data type of user profiles 162 which are stored in storage 114 in some instances. The user profiles 162 are configured to as a database corresponding to a particular meeting participant, wherein the user profile stores data that is associated with or linked to the meeting participant.

For example, referring to FIG. 10, the user profile 162 includes a voice profile 1002 (e.g., a voice profile comprised of acoustic features extracted from audio speech associated with the meeting participant), a face profile 1004 (e.g., a face profile comprised of visual features extracted from video and/or image data associated with the meeting participant), a role and/or position data 1006 (e.g., a role vector 460 or organizational data), one or more tags 1008 (e.g., tag for linking the user profile to a meeting participant and/or speech tags), links 1010 (e.g., links to external data, recordings, documents, etc.) electronic content 1012 (e.g., attributed sub-portions of electronic content), identifiers 1014 (e.g., formal names, user names, numerical identifiers, and/or action items 1016 (i.e., action items that were either assigned by or assigned to the meeting participant).

In some embodiments, the voice profile 1002 is generated and/or updated, at least in part, by the ASR model 140 and/or data processed by the ASR model 140, wherein the voice profile 1002 is an aggregation of audio speech having similar acoustic features. In some instances, the voice profile 1002 includes labeled characteristics such as native language, spoken language, accent, dialect, etc. In some embodiments, the face profile 1004 is generated and/or updated, at least in part, by the face recognition model 141, wherein the face profile 1004 comprises an aggregation of image and/or video data having similar visual features as associated with a face and/or body of a person (e.g., contributing entity and/or meeting participant). The face profile 1004, in some instances, includes labeled characteristics such as eye color, hair color, face shape, prominent features, height, etc.

In some embodiments, the user profiles 162 include a plurality of stored user profiles (e.g., previously generated and/or updated user profiles) and/or a plurality of guest profiles. In some instances, the guest profiles are newly generated guest profiles that are generated in response to processing meeting content. Additionally, or alternatively, the guest profiles are previously generated and stored guest profiles and/or the guest profiles are stored profile templates (e.g., unpopulated, non-updated guest profiles).

In some embodiments, the guest user profile becomes a known user profile when the guest user profile is tagged with the identity of a meeting participant, thereby linking the user profile and its associated electronic content to the meeting participant. Thus, the electronic content associated with the user profile is attributed to that particular meeting participant. In some embodiments, the guest user profile remains untagged, for example, when the identity of the contributing entity associated with the electronic content is unknown and/or unidentifiable. These user profiles are accessible by the profile attribution model 149. In some embodiments, the profile attribution model 149 is configured to generate new user profiles (e.g., a guest user profile) and/or update existing user profiles (e.g., a tagged user profile and/or previously stored guest user profile).

In some embodiments, the profile attribution model 149 utilizes the electronic content 150 (audio and visual data) to identify sub-portions to attribute to a user profile. Additionally, or alternatively, the profile attribution model 149 utilizes only audio data and/or only visual data to attribute sub-portions to a user profile. In some embodiments, each of a plurality of sub-portions of the electronic data (e.g., electronic data 150) are attributed to at least one user profile. Alternatively, one or more of the plurality of sub-portions of the electronic data are attributed to one or more user profile. In some embodiments, a sub-portion is attributed to one user profile, while in some embodiments, a sub-portion is attributed to one or more user profiles. In some embodiments, one or more sub-portions are not attributed to any user profiles. In some embodiments, the profile attribution model 149 utilizes data extracted from a transcription of the electronic content (e.g., transcripts 154).

The profile attribution model 149 is configured to recognize one or more contributing entities (e.g., participants in a meeting) based on visual and/or acoustic features of each contributing entity. For example, sub-portions of electronic content obtained from a particular meeting are aggregated based on similar and/or matching visual and/or acoustic features. One or more matching sub-portions of the electronic content are then attributed to a particular user profile.

In some embodiments, the profile attribution model 149 is configured to attribute, in real time, a sub-portion of electronic content to a user profile as soon as the sub-portion is detected and/or recorded (i.e., profile attribution during a meeting). In some embodiments, the profile attribution 149 is configured to attribute sub-portions of electronic content after a meeting.

During a meeting and/or a meeting transcription process, the profile attribution model 149 is configured to automatically detect one or more speakers (e.g., contributing entities) and distinguish the speakers from each other with one or more user profiles. If a speaker is not able to be matched with a previously stored user profile, the speaker is linked to a guest profile. The speakers are linked to user profiles based on audio and/or video signals. The computing system 110 is also configured to allow users to tag the user profiles, especially guest profiles) by providing identifiers like a username, an email, and other identifying information that helps to identify the speaker to which the user profile has been linked and/or any electronic content attributed to the user profile. The computing system 110 is also configured to allow users to optionally store the user profiles (tagged and/or guest user profiles) for future usage, wherein the user profiles become stored user profiles.

The profile attribution model 149 is configured to identify electronic content (i.e., data retrieved from one or more of the service(s) 120). Once the electronic content is identified, a sub-portion of the electronic content is selected. Based on one or more characteristics of the sub-portion of the electronic content, the profile attribution model 149 determines whether or not the sub-portion of the electronic content should be attributed to a user profile. The attribution process is described in further detail in reference to FIGS. 6-10 below.

In some embodiments, the profile attribution model 149 is configured to receive data output from an ASR model (in some examples, ASR model 140) such as acoustic features extracted by an acoustic model of the ASR model and/or labels applied via a language model of the ASR model. Additionally, or alternatively, the profile attribution model 141 is configured to receive data output (e.g., visual features extracted from an image or video) from a face recognition model (in some examples, face recognition model 141). In some embodiments, the aforementioned ASR model is incorporated into the speech service(s) 120A and/or the aforementioned face recognition model is incorporated into the video and/or image services 120B, 120C.

Attention will now be directed to FIG. 2 which illustrates one embodiment of a process flow diagram, and possible corresponding process flow paths, of a computing system (such as computing system 110) that is configured to include and/or implement aspects of the disclosed embodiments.

As shown, electronic content 150 is obtained from a meeting (e.g., audio speech from a recorded/recording audio stream, meeting documents, emails, memos, etc.). The electronic content 150, including audio speech, is sent to a speech tag model 144, wherein the speech tag model generates a plurality of speech tags 152 which highlight certain portions of the electronic content for use in transcription generation (e.g., input to the ASR model 140), post-processing (e.g., input to post-process model 142), template generation and population (e.g., input to the template model 146) and/or summarization (e.g., input to the summarization model 148). These speech tags 152 facilitate the inclusion of specific user-identified portions of the transcript and aid the model(s) in identifying salient information for post-processing, metadata enriching, summarization and/or for meeting minutes templates. In some embodiments, the note type identified in the speech tag 152 corresponds to input fields of one or more templates of the template model 146.

The electronic content 150 is also sent to the ASR model (in parallel or in series with the speech tag model 144), wherein the ASR model recognizes speech and applies speech labels to generate an original transcription (e.g., transcript 154A). In some embodiments, the ASR model 140 also extracts metadata 156 from the electronic content 150, the metadata 156 being associated with the transcript 154A.

The original transcript 154A is then sent to the post-process model 142 to under post-processing as described herein (e.g., error correction and/or improvements to readability).

Additionally, or alternatively, the original transcript 154A is sent to the template model 146 having access to a plurality of templates (e.g., templates 146A, 146B, 146C, 146D) to provide a basis from which to generate a new template, modify an existing template, and/or populated a template (e.g., populated template 160A). In some embodiments, the original transcript 154A is sent to the summarization model 148 to generate an abstractive summary 158A.

Once the original transcript 154A is post-processed, and the post-process model 142 generates a post-processed transcript 154B, the post-processed transcript 154B is input to the summarization model 148, wherein an abstractive summary 158A is generated based from the post-processed transcript 154B. Additionally, or alternatively, the post-processed transcript 154B is input to the template model 146. In some embodiments, the post-processed transcript 154B is further enriched with metadata 156 to create a Metadata-Enriched Transcript 154C. This transcript 154C is then input to the summarization model 148 and/or the template model 146.

In some embodiments, the input fields (i.e., framework) for the generated templates are extracted from the original transcript 154A, the post-processed transcript 154B, and/or the summary 158A. In some embodiments, the content that is used for auto-population of a template is extracted from similar sources.

Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
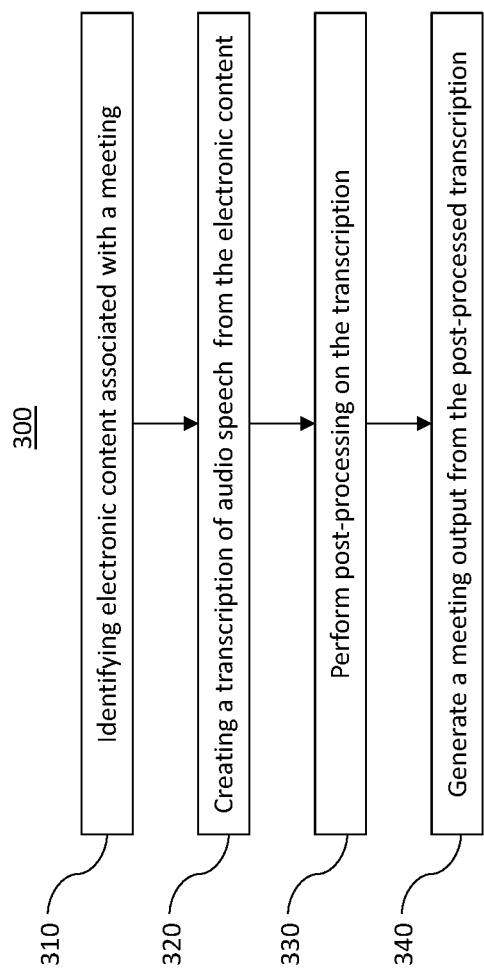
FIG. 3 illustrates one embodiment of a flow diagram having a plurality of acts associated with methods for automatically processing electronic content and generating corresponding output.

Attention will now be directed to FIG. 3 which illustrates a flow diagram 300 that includes various acts associated with exemplary methods that can be implemented by computing systems, such as computing system 130 described above in reference to FIG. 1. As shown in FIG. 3, the flow diagram 300 includes a plurality of acts (act 310, act 320, act 330, and act 340) which are associated with various methods for automatically processing electronic content and generating output based on the processed (and/or post-processed) electronic content. Examples of claimed components claimed in the acts are described in reference to features of a computing system, for example, computing system 110 of FIG. 1 and/or associated process flow diagram paths as described in reference to FIG. 2.

As shown in FIG. 3, the flow diagram 300 and corresponding methods include an act of a computing system (e.g., computing system 110) identifying electronic content (e.g., electronic content 150) associated with a meeting, the electronic content including audio speech (act 310). After identifying electronic content, the computing system creates a transcription (e.g., transcript 154A) of audio speech detected in the electronic content with an ASR model (e.g., ASR model 140) trained on speech-to-text training data, wherein the transcription is a text-based transcription (act 320).

The computing system then performs post-processing on the original transcription to generate a post-processed transcription (e.g., transcript 154B) by using a machine learning model (e.g., post-process model 142) trained on post-processing training data for modifying text included in the original transcription (act 330). In some embodiments, the post-processing includes both (1) modifying at least one of a punctuation, grammar, or formatting of the transcription that was introduced by the ASR model and (2) changing or omitting one or more words in the transcription which were included in both the audio speech and the transcription.

Once the transcription is post-processed, the computing system generates output based from the post-processed transcription, the output comprising at least one of a meeting summary (e.g., summaries 158 and/or summary 158A) generated by a machine learning summarization model (e.g., summarization model 148) that summarizes content of the post-processed transcription or a template (e.g., templates 160, generated templates 146A, 146B, 146C, 146D, and/or populated template 160A), wherein the template is generated (and/or populated) at least in part from the post-processed transcription (act 340).

Abstractive Summarization

Typically, the input to the summarization generation engine (e.g., summarization model 148) is a meeting transcript consisting of multiple turns from multiple speakers, coming from the ASR (e.g., ASR model 140) results.

Each turn corresponds to a speaker and associated utterance. There are several challenges to generating summaries for transcriptions, especially for transcriptions of meetings. First, because the meeting is carried about between multiple participants, the transcript includes utterances from multiple speakers wherein each speaker is characterized by different semantic styles, standpoints, contributing roles, and even different acoustic features cause the ASR results to be variable between speakers. The heterogeneous nature of the transcript makes it difficult for a singularly trained model to adapt to so many dependent variables.

In some embodiments, the input to the summarization model 148 also includes data extracted from one or more user profiles 162 generated by the profile attribution model 149, wherein each turn is associated to a user profile 162.

Conventional summarization models are also typically trained and well adapted for document summarization. However, meeting transcriptions are, on average, are between 5 and 10 times longer than standard documents. This poses a great challenge to the time and space efficiency of summarization models. Additionally, the structure and flow of content in a meeting transcript is often highly variable as compared to written documents.

Disclosed embodiments are provided herein to overcome the aforementioned challenges and present improved solutions to meeting transcription summarization. First, as meeting transcripts are usually lengthy (e.g., over 4,000 tokens), a direct application of a canonical transformer (i.e., conventional models) is not feasible. For instance, conducting a multi-head self-attention mechanism on a transcript with thousands of tokens is very time consuming and will cause memory overflow problems for the computing system. In contrast, leveraging a hierarchal structure facilitates a reduction in the computational burden. Since a meeting consists of utterances from different participants, it naturally forms a multi-turn hierarchy. Thus, a hierarchal structure of the summarization model follows the multi-turn hierarchy of the meeting transcription.

Figure 4:
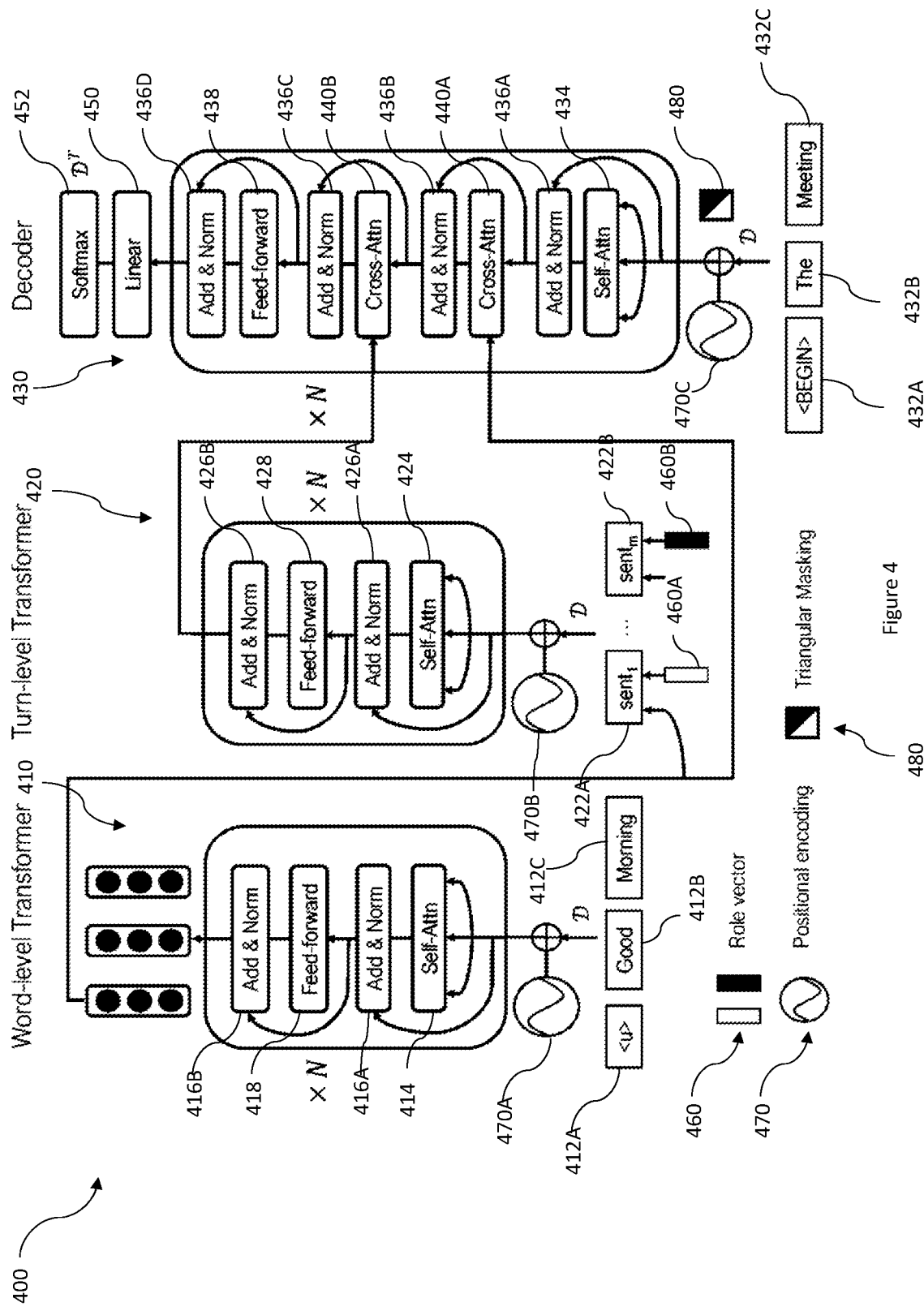
FIG. 4 illustrates one embodiment of a design overview of a machine learning model configured for abstractive summarization.

Attention will now be directed to FIG. 4 which illustrates one example of a neural network 400 configured as an abstractive summarization model (e.g., summarization model 148). Thus, the summarization model carries out both a token-level understanding within each turn (e.g., word-level transformer 410) and a turn-level understanding (e.g., turn-level transformer 420) across the whole of the meeting transcription. During summary generation, the neural network 400 (e.g., Hierarchal Meeting summarization Network 'HMNet') applies attention (e.g., self-attention 414, 424) to both levels of understanding to ensure that each party of the summary stems from different portions of the transcript with varying granularity.

The overall training process for the neural network is end-to-end, optimizing the cross entropy of the generated summary. Consequently, the neural network 400 makes it very convenient to jointly fine-tune each component to enhance summarization performance. Each transformer in the network 400 is used to incorporate contextual information. For example, a transformer block consists of a multi-head attention layer (e.g., self-attention layers 414, 424) and a feed-forward layer (e.g., feed forward layers 418, 428). These layers are each followed by a layer-norm with residuals (e.g., add & norm layers 416A, 416B, 426A, 426B).

The attention is based on an inner product of query and key:

$$\text{Attention}(Q, K, V) = \text{softmax}\left(\frac{QK^T}{\sqrt{d}}\right)V$$

Multi-head attention employs the attention h times, each time projecting Q, K, V to a d-dim space:

$$\text{MultiHead}(Q,K,V) = \text{Concat}(A_1, A_2, \ldots, A_h)W^O$$

where $A_i = \text{Attention}(QW_i^Q, KW_i^K, VW_i^V)$

The feed-forward network utilizes two linear transformations:

$$\text{FFN}(x) = \max(0, xW_1 + b_1)W_2 + b_2$$

In addition, as attention mechanism juxtaposes words from all positions together, the position information is lost. To solve this problem, transformer has positional encoding 470 (e.g., positional encoding 470A, 470B, 470C for the word level transformer, turn-level transformer, and decoder, respectively).

PE is added to input vectors:

$$PE_{(i,2j)} = \sin\left(i/10000^{\frac{2j}{d}}\right)$$

$$PE_{(i,2j+1)} = \cos\left(i/10000^{\frac{2j}{d}}\right)$$

Where $PE_{(i,j)}$ stands for the j-th dimension of positional embedding for the i-th word in input. Thus, the transformer block on a sequence of n tokens can generate n output embeddings of the same dimension as input. Thus, multiple transformer blocks can be sequentially stacked to form a transformer network, denoted by:

$$\text{Transformer}(\{x_1, \ldots, x_n\}) = \{y_1, \ldots, y_n\}$$

In some embodiments, the problem of meeting summarization is formalized as follows. The input consists of meeting transcripts X and meeting participants P. Suppose there are 's' meetings in total. The transcripts are X={X1, . . . , Xs}. Each meeting transcript consists of multiple turns, where each turn is the utterance of a participant. Thus, Xi={(p1, u1), (p2, u2), (pLi, uLi)}, where $pj \in P, 1 \leq j \leq Li$, is a participant, and uj=(w1, . . . , wlj) is the tokenized utterance from pj. The human-labelled summary for meeting Xi, denoted by Yi, is also a sequence of tokens. So, the goal of the system is to generate meeting summary Y=(y1, . . . , yn) given the transcripts X={(p1, u1), (p2, u2), . . . , (pm, um)}. In other words, the goal is to maximize the conditional probability of the meeting summary Y given transcript X and network parameters.

The word-level transformer 410 processes the token sequence (e.g., 412A, 412B, 412C) of one turn in the meeting. Each token is encoded in one turn using a trainable embedding matrix D. Thus, the j-th token in the i-th turn, wi,j, is associated with a uniform length vector $D(w_{i,j}) = g_{i,j}$. To incorporate syntactic and semantic information, two embedding matrices are trained to represent the part-of-speech (POS) and entity (ENT) tags. Therefore, the token $w_{i,j}$ is represented by the vector $x_{i,j} = [g_{i,j}; POS_{i,j}; ENT_{i,j}]$. Note a special token $w_{i,0} = [BOS]$ is added before the sequence to represent the beginning of a turn (e.g., <u> 412A). Then, the output of the word-level transformer is denoted as follows:

$$\text{Word\_Transformer}(\{x_{i,0}, \ldots, x_{i,L_i}\}) = \{x_{i,0}^w, \ldots, x_{i,L_i^w}\}$$

The turn-level transformer 420 processes the information of all m turns in a meeting. To represent the i-th turn, the output embedding of the special token [BOS] is employed from the word-level transformer, i.e. $x^w_{i,0}$. Furthermore, it is concatenated with the role vector of the speaker for this turn, $p_i$. It follows that the output of the turn-level transformer is:

$$\text{Turn\_Transformera}(\{[x_{1,0}^w; p_1], \ldots, [x_{m,0}^w; p_m]\}) = \{x_1^t, \ldots, x_m^t\}$$

Furthermore, to accommodate the multi-speaker scenario, the neural network 400 incorporates the role of each speaker to encode different semantic styles and standpoints between participants. For example, a project manager usually emphasizes the progress of the project, whereas a user interface designer tends to focus on user experience and design features. Thus, the neural network 400 employs one or more role vectors 460 (e.g., role vector 460A, role vector 460B) for each meeting participant to represent the speaker's information during encoding. In some embodiments, roles are pre-defined (e.g., program manager, industrial designer, marketing expert, etc.). Additionally, or alternatively, the role of the speaker is inferred and defined by the model during analysis of the transcription. For each role (of any number of roles), a role vector 460 is trained to represent the role of the speaker as a fixed-length vector. This role vector 460 is appended to the embedding of the speaker's turn (e.g., 422A, 422B).

The vectorized representation of speaker roles plays an important part in boosting the performance of summarization. The performance can be further maximized if richer data is available in practice. For example, in some instances, if an organization chart of participants is available, the chart is added in representations of the relationship between participants, e.g., manager and developers, into the network. If there is a pool of registered participants, each participant is assigned a personal vector which acts as a user portrait and evolves as more data about this user is collected.

The decoder 430 is a transformer to generate the summary tokens. The input to the decoder transformer contains the k−1 previously generated summary tokens ŷ1, . . . , ŷk−1. Each token (e.g., 432A, 432B, 432C) is represented by a vector using the same embedding matrix D as the encoder, $D(\hat{y}_i) = g_i$. The decoder transformer 430 is different from its counterpart in the encoder in two ways. First, as the tokens are generated from left to right, the input to the self-attention layer 434 has to be masked with a lower triangular matrix 480 to avoid peeking at future information.

Second, the decoder transformer block includes two additional cross-attention layers (e.g., layers 440A, 440B). After self-attention 434, the embeddings first attend with token-level outputs $\{xW\}m,Li$, and then with turn–i,j i=1,j=1 level outputs $\{xTi\}mi=1$, each followed by layer-norm (e.g., layers 436A, 436B) with residuals. This makes the model attend to different parts of the inputs with varying scales at each inference step.

The output of the decoder transformer is denoted as:

$$\text{Decoder\_Transformer}(\{g_1, \ldots, g_{k-1}\}) = \{x_1^d, \ldots, x_{k-1}^d\}$$

To predict the next token $\hat{y}_k$, the network reuses the weight of embedding matrix D to decode $v_{k-1}$ into a probability distribution over the vocabulary:

$$P(w_k | w_{<k}) = \text{softmax}(x_{k-1}^d D^T)$$

For example, a linear layer 450 and SoftMax layer 452 are applied as final layers to the output of the decoder 430.

During the training of the model, techniques are employed to minimize the cross entropy. In some embodiments, a teacher-forcing is used during decoder training (i.e., the decoder takes the ground-truth summary tokens as input). During inference, a beam search is used to select the best candidate. The search starts with the special token <BEGIN> (e.g., token 432A). A common trigram blocking is also used during beam search, if a candidate work creates a trigram that already exists in the previously generated sequence of the beam, wherein the model forcibly sets the word's probability to zero. Finally, the summary with the highest average log-likelihood per token is selected as the final output of the summarization model.

The disclosed embodiments are also directed to methods for training a summarization model and generation of training data to be used in training the model. For example, the amount of annotation for meeting summarization is usually inadequate. To solve the data sparsity issue, several data augmentation approaches are used to enlarge the size of the training data. A first approach splits a meeting summary by speakers. In the labeling phase, the annotator writes a summary for each speaker in the meeting. During the training phase, the model takes only the turns from the specific speaker as the input and the corresponding summary as the output.

In some embodiments, the meeting summary is split by user profiles, wherein some user profiles are tagged with an identity corresponding to a known speaker and some user profiles are guest profiles wherein the speaker identity is unknown.

In the second approach, a pseudo meeting summarization annotation is created from large news summarization corpus. For each news article, each paragraph is treated as a turn in the meeting and a placeholder role is assigned to all turns. The summary written by the editor is treated as the ground truth. These approaches have been shown to significantly improve the summarization quality of the summarization model where the amount of meeting annotation is limited.

The output of the neural network 400 (also see summarization model 148) is innovative by using words that are not directly extracted from the transcript to generate the summary of the transcript. The level of abstractness of the summary is measured via the ratio of novel words or phrases in the summary to directly extracted words. A higher ration, then, in some instances, indicates a more abstractive summary. Thus, the system tends to summarize meetings a high level (e.g., topics and/or decisions) without presenting large amounts of details regarding the high-level concepts.

Figure 5:
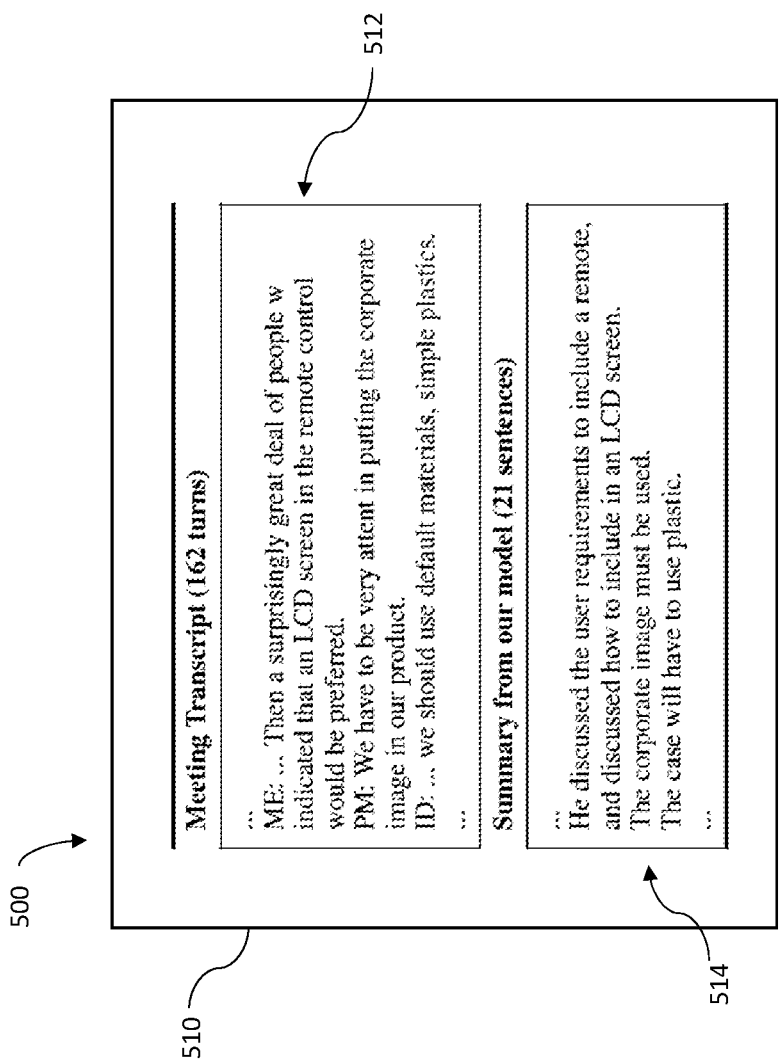
FIG. 5 illustrates one embodiment of a user interface displaying an example of a summary generated by a machine learning model configured for abstractive summarization.

Attention will now be directed to FIG. 5, which illustrates one example of a user interface 510 displaying a portion of a meeting transcription 512 and corresponding portion of a summary 514 generated by a summarization model (e.g., summarization model 148 and/or neural network 400). As shown in FIG. 5, the meeting transcript 512 includes a plurality of turns (e.g., 162 turns) corresponding to a plurality of speakers associated with a plurality of roles (e.g., marketing expert 'ME', program manager 'PM', industrial designer 'ID'). The summary 514 includes 21 abstractive sentences, including keywords identified in the meeting transcript 512 (e.g., LCD screen, corporate image, plastic). For example, "Then, a surprisingly great deal of people w indicated that an LCD screen in the remote control would be preferred." Is summarized by "He discussed the user requirements to include a remote, and discussed how to include in an LCD screen."

In some embodiments, wherein the transcription includes errors introduced by the ASR model, post-processing of the transcript is performed to identify and correct those errors. For example, a post-processed version of the meeting transcript 512 omits the character "w" as it appears to be an extraneous text (i.e., mis-labeled audio speech). In some embodiments, the transcription is highly accurate in recognizing and labeling speaker words. However, in some instances, the speaker may introduce errors in their speech that decrease the readability of the transcript. For example, as shown in the user interface 510, program manager (PM) said, "We have to be very attent in putting the corporate image in our product."

The post-process model (e.g., post-process model 142) is also configured to identify ungrammatical sentences, phrases, and/or words created by the user and/or by the ASR model that persist in the transcription and either omit and/or replace the label with a more grammatical version. For example, a post-processed version of the PM's transcription is "We have to be very intent in putting the corporate image in our product" or "We have to be very attentive in putting the corporate image in our product." In these examples, "attent" which is not a canonically recognized word is replaced with "intent" and/or "attentive" which are relevant to the speaker's original meaning and improves the grammatical and semantic syntax of the sentence. These examples are also representative of modifications made during post-processing of the original transcript (e.g., transcript 154A of FIG. 2) to a post-processed transcript (e.g., transcript 154B of FIG. 2).

In some embodiments, the post-processing includes adding words and/or phrases to make the transcription more readable and grammatically correct. For example, a post-processed version of the transcription corresponding to the industrial designer (ID) is " . . . we should use default materials, such as simple plastics." The inclusion of the phrase "such as" improves the readability (i.e., a reader's understanding) of the following words "simple plastics" which the speaker intended to name as examples of "default materials." In this manner, the system actually modifies the content of the original audio speech that persists in the transcript by adding text to the audio speech/transcript to make it more clear and easier to summarize.

Additionally, post-processing modifications described above and/or any of the other modifications described herein (e.g., replacing/deleting/modifying terms) in the transcript that comprise errors and/or unclear terms/phrases that are either introduced by an ASR model and/or introduced by the speaker's original verbal communication, greatly improves any downstream processing of the transcription, such as, for example, in summarizing the transcription.

In this manner, trained models such as the neural network 400 which often follow some grammatical rule-based data sets, are better able to analyze and synthesize information from the transcription into a summary (e.g., summary 514). Furthermore, errors in the transcriptions are prevented from being propagated into the downstream outputs (e.g., summaries and/or templates).

In some embodiments, the resulting summary 514 results from post-processing to remove and fix any errors introduced from the transcription model and/or by the summarization model. For example, the extraneous comma in the first sentence is removed and the word "in" is removed so that the summary reads, "He discussed user requirements to include a remote and discussed how to include an LCD screen."

In some embodiments, the summary 514 is generated and/or post-processed to read, "He discussed user requirements to include an LCD screen in the remote." In some embodiments, the summary 514 is enriched with further descriptions, such as "The marketing expert discussed user requirements . . . " and/or "The program manager indicated that the corporate image must be used." In some instances, the last illustrated sentence of the summary 514 is post-processed and/or enriched to read, "The case for the remote will have to use plastic" wherein "for the remote" helps the reader understand more context for the case and it's requirement to be plastic.

Summaries (e.g., summaries 158, abstractive summary 158A, summary 514) are able to be evaluated based on several criteria or metrics, wherein a post-processing is applied to the transcription and/or the summary output until a certain level or threshold of each criteria is reached. In some embodiments, the summaries are evaluated for readability and relevance. Readability is a measurement of how fluent the summary language is, including word and grammatical error rate and ratio of coherent to incoherent phrases. Relevance measures how well the summary sums up the main ideas of the meeting. Ultimately, the fewer errors that exist in the original transcription, the more readable and relevant the summary will be.

In some embodiments, the length of the summary is determined based on a length of the original and/or post-processed transcription of the meeting. In some embodiments, the length of the summary is determined based on summary training data ground truth. In some embodiments, one or more summaries is generated based on an individual reader's preference and/or a collective group's preference. In some embodiments, a plurality of summaries is generated wherein each summary is adapted to a particular reader as identified in a hierarchal organizational structure of relevant parties.

In some embodiments, these preferences and/or a placement associated with the hierarchal organizational structure of the relevant parties is stored as part of a user profile corresponding to the particular reader.

In some embodiments, certain role vectors are weighted more heavily than other role vectors, such that the summarization is based on a greater volume of content from one role than from another role. In some embodiments, summaries are generated across a plurality of meetings, wherein the meetings are chronological and/or related. In some embodiments, summaries are generated based on a focus to a specific theme, topic, task, and/or project, wherein the summaries include information from one or more meeting transcriptions discussing the particular theme, topic, task, and/or project.

Furthermore, in addition to summarization, other applications such as automatic subtitle generation and meeting minutes generation require automatic speech transcription that is highly readable for humans, while machine translation, dialogue systems, voice search, voice question answering, and many other applications also require highly readable transcriptions to generate the best machine response. The existence of defects in the speech transcriptions will significantly harm the experience of the application for users if the system cannot mitigate the effects of the defects.

Attention will now be directed to FIG. 6 which illustrates an example embodiment of a process flow diagram 600, and possible corresponding process flow paths, of a computing system (such as computing system 110) that is configured to include and/or implement aspects of the disclosed embodiments. It should be appreciated that process flow diagram 600 is related to the process flow diagram 200 shown in FIG. 2, wherein the flow diagram 600 of FIG. 6 further includes a profile attribution model 600 and user profiles 662 integrated into the process flow paths of the flow diagram 200 of FIG. 2.

In some embodiments, the profile attribution model 600 obtains electronic content 150 for example, as associated with a meeting. Sub-portions of the electronic content 150 are attributed to one or more user profiles 662 which are also generated and updated by the profile attribution model 600.

In some embodiments, the profile attribution model 600 is configured to process data from the speech tag model 144, including the use of speech tags 152 generated by the speech tag model 144. Additionally, or alternatively, the speech tag model 144 is configured to process data from the profile attribution model 600, including accessing data associated with one or more user profiles. In some embodiments, the speech tags 152 are included in the user profiles 662.

In some embodiments, the sub-portion of electronic content used by the profile attribution model includes an identified speech tag 152, wherein the attribution of the sub-portion of the electronic content to a particular user profile facilitates an improvement in accuracy of linking one or more speech tags 152 to a particular entity (the entity being associated with the user profile 662 via an identifying tag). For example, data, for example, an action item, deadline, assigning party, and/or responsible party, associated with speech tag 152 is included in the data stored and/or linked to the user profile 662.

Thus, in some embodiments, the computing system uses a machine learning speech tagging model to generate the speech tags, wherein the machine learning speech tagging model generates at least one tag in response to identifying a spoken starting keyword and a spoken ending keyword detected in the sub-portion of electronic content. For example, the generating of the at least one tag includes links the at the least one tag to the user profile to which the sub-portion of electronic content is attributed.

In some embodiments, metadata 156 output by the ASR model 140 and/or data extracted from the metadata enriched transcript 154C is processed by the profile attribution model 600 to facilitate an improvement in accurately attributing a sub-portion to a particular user profile and/or accurately tagging a particular user profile to the corresponding contributing entity.

In some embodiments, the user profiles 662 and corresponding sub-portions from electronic content 150 attributed to the user profiles 662 are utilized by the ASR model 140, summarization model 148 and/or template model 146. In some embodiments, data extracted from one or more user profiles 662 are linked to a transcript 154A and/or included in the transcript 154A generated by the ASR model 140. For example, if a sub-portion of the electronic content 150 is previously attributed to a particular user profile, the ASR model 140 can automatically assign the labeled portion of audio speech included in the sub-portion to a particular speaker.

For example, in some instances, the computing system creates a transcription of audio speech included in the electronic content with an automatic speech recognition (ASR) model, wherein the transcription is divided based on one or more identified sub-portions of electronic content. In such instances, each sub-portion of electronic content is labeled with an identifier associated with a user profile to which the sub-portion of electronic content is attributed.

In some embodiments, wherein the transcription (e.g., transcript 154B, and/or 154C) includes a plurality of links that point to external data related to the electronic content. The external data related to the electronic content is external to the electronic content and corresponds to a particular sub-portion of electronic content that is stored in the user profile to which the particular sub-portion of electronic content is attributed.

In some embodiments, the transcription includes text-based descriptions of visual performance data of a meeting participant extracted from the sub-portion of electronic content attributed to the user profile corresponding the meeting participant. It is anticipated that the visual performance data will be collected by image and/or video services (e.g., image service(s) 120B and/or video service(s) 120C of FIG. 1).

In some embodiments, the computing system generates output based from the transcription, the output comprising at least one of a meeting summary (e.g., summary 158A) generated by a machine learning summarization model (e.g., summarization model 148) that summarizes content of the transcription or a template (e.g., template 160A) that is generated at least in part from the transcription.

In some embodiments, the output comprises the meeting summary which is automatically generated based on abstractive summarization of the transcription by a summarization model. In such instances, the summarization model 148 is configured to break the transcription into a plurality of turns comprising a plurality of words, the turns corresponding to a plurality of sub-portions of electronic content. Then, the summarization model 148 analyzes each turn based on a role vector of a speaker corresponding to the turn, wherein the role vector that is applied is based on the user profile to which each sub-portion of electronic content corresponding to each turn is attributed. The summarization model 148 then selectively applies one or more different rules during the analyzing, each of the one or more different rules being based on one or more correspondingly different roles from which the role vector is determined.

In some embodiments, if a particular sub-portion of electronic content is included in the summary 158A, the summary is also able to be linked to the same user profile 662. In some instances, where the summary 158A includes one or more identifiers that identify the contributing entity associated with a part of the summary, the identity and/or identifier for the contributing entity is generated based on data extracted from the user profile linked to that particular contributing entity.

In some embodiments, a meeting output comprises a template which is a meeting template that is automatically selected from a plurality of different templates. The template is selected based on a meeting type that is determined from analyzing the transcription and which is automatically populated with content from the transcription, including data corresponding to one or more user profiles to which one or more sub-portions of the transcriptions are attributed.

Thus, in some embodiments, for example, where a populated template 160A is output by the template model 146, the populated template is generated and/or populated based on data extracted from one or more user profiles 662. For example, based on preferences included with the user profile 662, the template is customized to the user profile 662, thereby customizing the template 160A to the contributing entity tagged with the user profile 662. In some embodiments, wherein the user profile is not tagged (i.e., a guest user profile), the template is still able to be customized to the user profile without having to know the explicit identity of the contributing entity (e.g., meeting participant).

Figure 7:
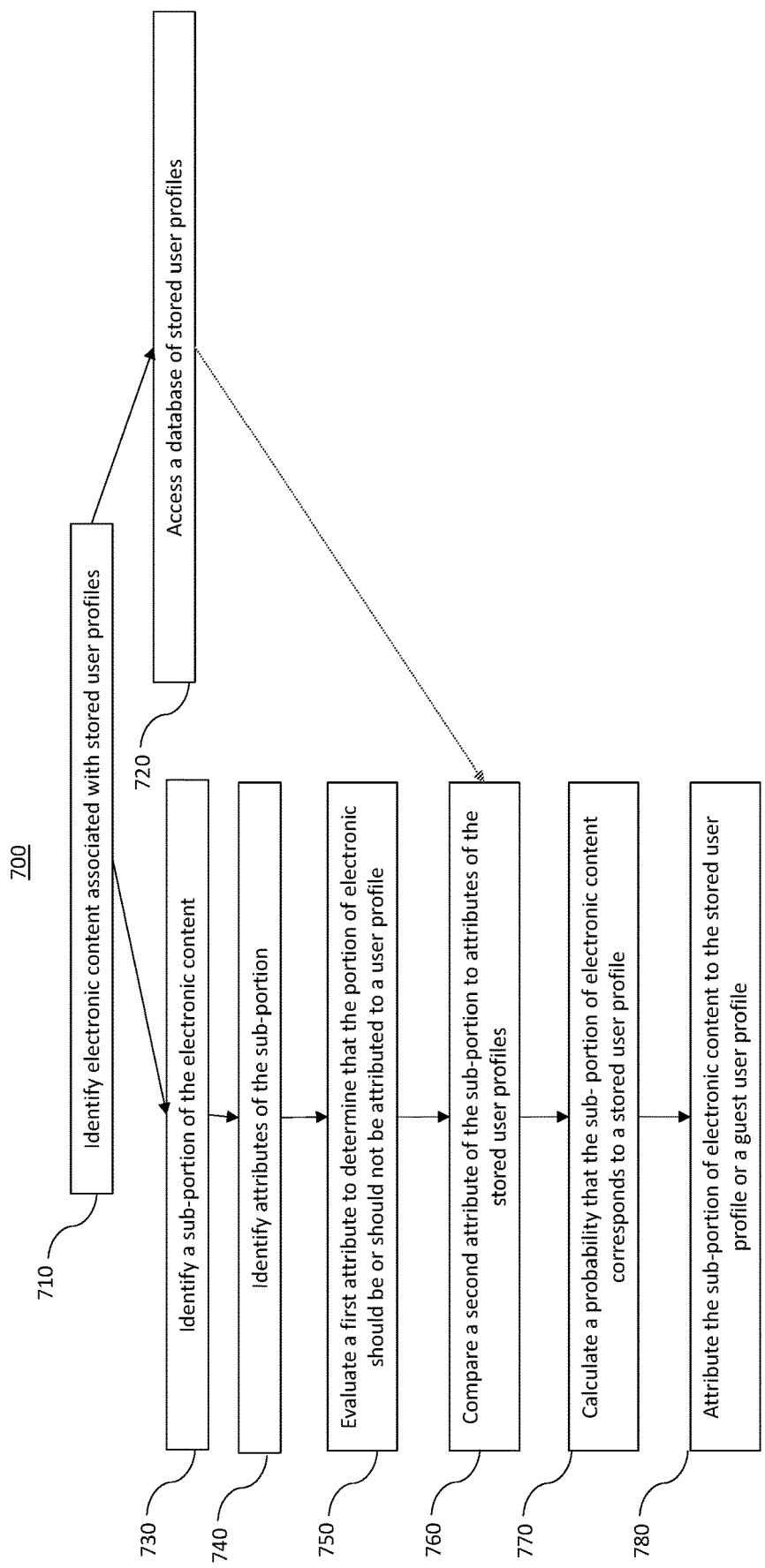
FIG. 7 illustrates one embodiment of a flow diagram having a plurality of acts associated with methods for automatically processing electronic content and attributing sub-portions of the electronic content to one or more contributing entities associated with the electronic content.

Attention will now be directed to FIG. 7 which illustrates a flow diagram 700 that includes various acts associated with exemplary methods that can be implemented by computing systems, such as computing system 130 described above in reference to FIG. 1. As shown in FIG. 7, the flow diagram 700 includes a plurality of acts (act 710, act 720, act 730, act 740, act 750, act 760, act 770, and act 780) which are associated with various methods for automatically processing electronic content and attributing sub-portions of the electronic content to contributing entities. Examples of claimed components claimed in the acts are described in reference to features of a computing system, for example, computing system 110 of FIG. 1 and/or associated process flow diagram paths as described in reference to FIG. 6.

As shown in FIG. 7, the flow diagram 700 and corresponding methods include an act of a computing system (e.g., computing system 110) identifying electronic content (e.g., electronic content 150) associated with a plurality of stored user profiles (act 710). After identifying electronic content, the computing system identifies a sub-portion of the electronic content (act 730). Once the sub-portion is identified, the computing system identifies attributes of the sub-portion (act 740) and evaluates at least a first attribute of the sub-portion of electronic content to determine that the sub-portion of electronic content should be attributed to a user profile (e.g., user profiles 162, 662) of a plurality of user profiles (act 750). The computing system also accesses a database storing a plurality of stored user profiles including a plurality of known user profiles and a plurality of previously generated guest user profiles (act 720).

In response to a determination that the sub-portion of electronic content should be attributed to the user profile of the plurality of user profiles, the computing system compares a second attribute of the sub-portion of electronic content to one or more attributes of the stored user profiles (act 760). Thereafter, the computing system calculates a probability that the sub-portion of electronic content corresponds to one or more of the stored user profiles (act 770). Based at least in part on the calculated probability, attribute the sub-portion of electronic content to at least one of the stored user profiles or to a guest user profile (act 780).

In some embodiments, once the sub-portion(s) of the electronic content are attributed and/or the user profile are tagged, the computing system generates output based at least in part from the user profiles and attributed content, the output comprising at least one of a meeting summary (e.g., summaries 158 and/or summary 158A) generated by a machine learning summarization model (e.g., summarization model 148) that summarizes content of the post-processed transcription and one or more user profiles or a template (e.g., templates 160, generated templates 146A, 146B, 146C, 146D, and/or populated template 160A), wherein the template is generated (and/or populated) at least in part from the post-processed transcription (act 340) and one or more user profiles.

Figure 8:
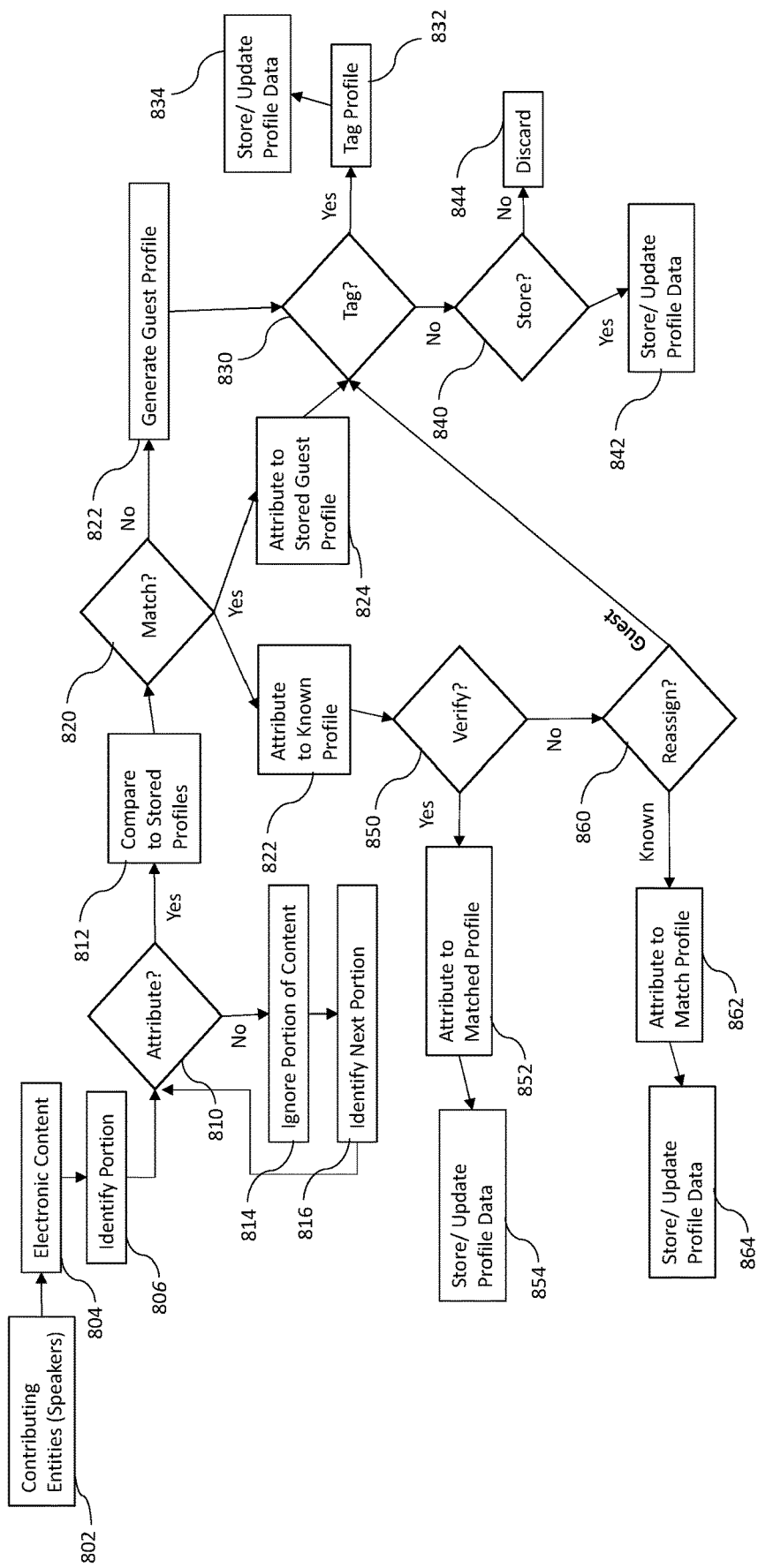
FIG. 8 illustrates an example embodiment of a process flow diagram for determining the attribution of electronic content to user profiles.

Attention will now be directed to FIG. 8, an example embodiment of a process flow diagram illustrating possible paths for attributing electronic content to a user profile and tagging the user profile. For example, in some embodiments, one or more contributing entities (i.e., speakers) 802 are contributors to electronic content 804 (e.g., electronic content 150 of FIG. 1) recorded and/or aggregated by, for example, speech service(s) 120A, image service(s) 120B, video service(s) 120C, ASR model 140, and/or face recognition model 141. In some embodiments, the electronic content 804 is associated with audio and visual data collected from a meeting in which the contributing entities 802 are meeting participants. A sub-portion of electronic content is identified (e.g., identify portion 806) and selected for determining whether or not the sub-portion should be attributed to a user profile (e.g., attribute? 810).

In some embodiments, the determination that a sub-portion of electronic content should or should not be attributed to a user profile is based, at least in part, on an evaluation of one or more identified attributes corresponding to the sub-portion. For example, in some embodiments, an attribute of the sub-portion of electronic content corresponds to a predetermined set of relevance criteria of the sub-portion of electronic content relative to an entire context of the electronic content, wherein the determination to attribute the sub-portion of the electronic content to at least one user profile is at least in part based on a value of the level of relevance or a value of the level of importance exceeding a value of a pre-determined attribution level threshold.

In some embodiments, the predetermined set of relevance criteria includes one or more of the following: a time duration, a word count, one or more keywords pre-determined to indicate a level of importance or level of relevance, or one or more unrecognizable words or intervals of the sub-portion of electronic content.

In some embodiments, the level of relevance and/or level of importance relates to the usefulness of including the content of the sub-portion in downstream operations such as transcription, post-processing, summarization, and/or template generation. Additionally, or alternatively, the level of relevance and/or level of importance relates to the usefulness of including the content of the sub-portion in a user profile, for example, to facilitate an increased accuracy of attributing future electronic content to the correct contributing entity.

In some embodiments, an upper and/or lower threshold for the time duration and/or word count of a sub-portion is pre-determined, wherein the specified range is known to correspond to a higher likelihood that the sub-portion is relevant and/or important and should be attributed to at least one user profile. For example, in some instances, a sub-portion that is not long enough, such as less than 2 seconds and/or less than 3 words, will not include highly relevant or important information that would be beneficial to attribute to a user profile. In some instances, the short time duration corresponds to the sub-portion containing background noise and/or unintended noise generated from a speaker. In some embodiments, the profile attribution model 141 learns the best upper and/or lower thresholds to achieve an optimal attribution of relevant and/or important electronic content.

In some embodiments, the one or more keywords includes words used as "filler" words such as "uhm", "yeah", "so", "uh", etc. which do not contribute to an increased understanding of the semantic meaning of the audio speech and therefore would not be relevant and/or important to include in a user profile and/or other downstream operations. In some instances, the sub-portion includes one or more words that are unrecognizable, and therefore, not able to be labeled by an ASR model (e.g., ASR model 140). In some embodiments, the lack of detected labels indicates a level of relevance and/or level of importance that does not exceed a profile attribution threshold. For example, in some embodiments, it is not useful to attribute unrecognizable speech to a user profile because it could not be used in downstream processing such as speech transcription, summarization, and/or template generation.

If the system determines that the sub-portion should not be attributed to a user profile, the computing system ignores that sub-portion of electronic content (e.g., ignore portion of content 814) and identifies a next sub-portion of electronic content (e.g., identify next portion 816), wherein the next sub-portion is evaluated to determine if it should be or should not be attributed to a user profile (e.g., attribute 810).

In some embodiments, the determination to attribute a sub-portion to at least one user profile (e.g., a stored user profile and/or a new guest user profile) is based on applying a labeling to audio speech included the identified sub-portion of the electronic content with an automatic speech recognition (ASR) model, calculating a confidence score associated with a probability of accuracy of the labeling characterizing the audio speech, comparing the confidence score to a predetermined confidence score threshold, and determining to attribute the sub-portion of electronic content to at least one of a stored or guest user profile when the confidence score meets or exceeds the predetermined confidence score threshold or to, alternatively, refrain from attributing the sub-portion of electronic content to the at least one of stored or guest user profile when the confidence score fails to meet or exceed the predetermined confidence score threshold.

If the system determines that the sub-portion should be attributed to a user profile, one or more attributes (e.g., a second attribute) of the sub-portion are compared to one or more attributes of one or more stored user profiles (e.g., compare to stored profiles 812) to determine if one or more attributes of the sub-portion match one or more attributes of a stored user profile (e.g., match? 820). In some embodiments, the second attribute of the sub-portion of electronic content corresponds to one or more attributes of a stored user profile that is associated with a contributing entity.

In some embodiments, the second attribute of the sub-portion of electronic content includes a voice profile compiled from acoustic data extracted from the sub-portion of electronic. If the voice profile matches a user voice profile (e.g., voice profile 1002 of FIG. 10) that is part of the stored user profile, the probability that the sub-portion should be attributed to the stored user profile is increased. In some embodiments, the second attribute of the sub-portion of electronic content includes a face profile compiled from image data extracted from a sub-portion of visual content included in the electronic content. If the face profile matches a user face profile that is part of the stored user profile, then the probability that the sub-portion should be attributed to the stored user profile is increased.

Additionally, or alternatively, attributes of the sub-portion could be determined to match to attributes of a stored user profile based on words known to be spoken at a certain frequency by a contributing entity 802 or acoustic features such as tone, pitch, rate of talking, accent, etc. Furthermore, visual attributes could match, such as gestures, facial expressions, etc.

Based on the comparison of one or more sub-portion attributes to one or more attributes of a stored user profile, a probability that the sub-portion corresponds to the stored user profile is calculated. Based on the calculated probability, the sub-portion is attributed to one of the stored user profiles that corresponds to a highest probability of correctly matching. For example, if attributes match, the sub-portion is attributed to a known user profile (e.g., attribute to known profile 822) included in the plurality of stored user profiles or is attributed to a previously generated and stored guest user profile (e.g., attribute to stored guest profile 824) included in the plurality of stored user profiles.

If the sub-portion is attributed to a known user profile, the computing system, in some instances, prompts a user to verify (e.g., verify 850) that the known user profile is the correct user profile to which the sub-portion should be attributed. If the verification is positive, the sub-portion is attributed to the matched known user profile (e.g., attribute to matched profile 852), wherein the profile data associated with the match known user profile is updated and/or the sub-portion is stored (i.e., linked to) the known user profile (e.g., store/update profile data 854).

If the verification is negative, in some embodiments, the computing system automatically reassigns the sub-portion to the next most likely stored user profile (i.e., stored user profile having the next highest probability) (e.g., reassign? 860). If the stored user profile is a known user profile, the sub-portion is attributed to the new matched known profile (e.g., attribute to match profile 862), wherein the profile data is stored and/or updated (e.g., store/update profile data 864). If the attribution of the sub-portion is reassigned to a stored user profile that is a guest profile, the computing system prompts a user to tag (e.g., tag 830) the guest profile to link the guest profile to the identity of a particular contributing entity.

In some embodiments, the computing system prompts a user to determine if the sub-portion should be reassigned (e.g., reassign 860). Additionally, or alternatively, the reassignment step is bypassed, either automatically or manually, wherein the sub-portion is attributed to the matched profile and the profile data is stored and/or updated.

In some embodiments, if the attributes of the sub-portion match to attributes of a stored guest profile, the sub-portion is attributed to the previously generated guest user profile included in the plurality of stored user profiles (e.g., attribute to stored guest profile 824). In some embodiments, the attribution is based at least in part on determining whether a calculated probability meets or exceeds a user profile confidence threshold, and then attributing the sub-portion of electronic content to the at least one of the stored user profiles when the calculated probability meets or exceeds the user profile confidence threshold, or alternatively, attribute the sub-portion of electronic content to the guest user profile when the calculated probability meets or exceeds the user profile confidence threshold.

In some instances, the attributes of sub-portion do not match attributes of a stored user profile (i.e., the calculated probability that the sub-portion corresponds to a known user profile or a previously generated guest profile does not exceed a pre-determined threshold, such as a user profile confidence threshold). In such instances, a new guest profile is generated (e.g., generate guest profile 822). In some embodiments, the generate guest profile 822 also is directed to selecting an unpopulated guest profile included in the stored user profiles, the unpopulated guest profile including the framework and/or allocated memory storage for the guest profile but has not been updated with any electronic content or identifiers linking to a contributing entity.

If the sub-portion of electronic is to be attributed to a guest profile (either vis 822 or 824), the computing system prompts a user to tag (e.g., tag? 830) the guest user profile with the identity of the contributing entity to which the guest user profile should correspond (i.e., the contributing entity responsible for contributing the sub-portion to the electronic content). In some embodiments, the computing system automatically tags the user profile. Additionally, or alternatively, the computing system generates a request for the guest user profile to be tagged to correspond to a contributing entity associated with the sub-portion of electronic content for linking the contributing entity to the guest user profile. For example, in response to user input that identifies the contributing entity, tag the guest user profile to correspond with the identified contributing entity, thereby linking the contributing entity to the guest user profile (e.g., tag profile 832). The profile data associated with the newly attributed sub-portion of electronic content and/or tag is stored and/or updated (e.g., store/update profile data 834).

In some instances, wherein the computing system generates a request for the guest user profile to be tagged to correspond to a contributing entity associated with the sub-portion of electronic content and in response to user input denying the request, the computing system stores the guest user profile in the database of stored user profiles (i.e., the newly generated guest user profile becomes now a previously generated guest user profile) (e.g., store/update profile data 842) or discards the guest user profile (e.g., discard 844).

In some embodiments, the updating of profile data (e.g., store/update profile data 854, 864, 834, 842) relates to updating the stored user profile based on identified attributes of the sub-portion of electronic content. For example, the identified attributes including one or more of the following: acoustic features extracted from a sub-portion of audio speech included in the sub-portion of electronic content or visual features extracted from a sub-portion of visual content included in the electronic content. In some embodiments, the updating of profile data (e.g., store/update profile data 854, 864, 834, 842) relates to storing the identified attributes corresponding to the sub-portion of electronic content as cached data associated with one or more stored user profiles and refraining from updating the one or more stored user profiles with the cached data. For example, the cached storage of attributes is used in determining which user profile of a plurality of user profiles to which a sub-portion will be attributed, but the attributes are not included in the assigned user profile. In some instances, the cached storage is cached for a pre-designated amount of time. In some instances, the cached storage is discarded after the sub-portion is attributed to a user profile.

Figure 9:
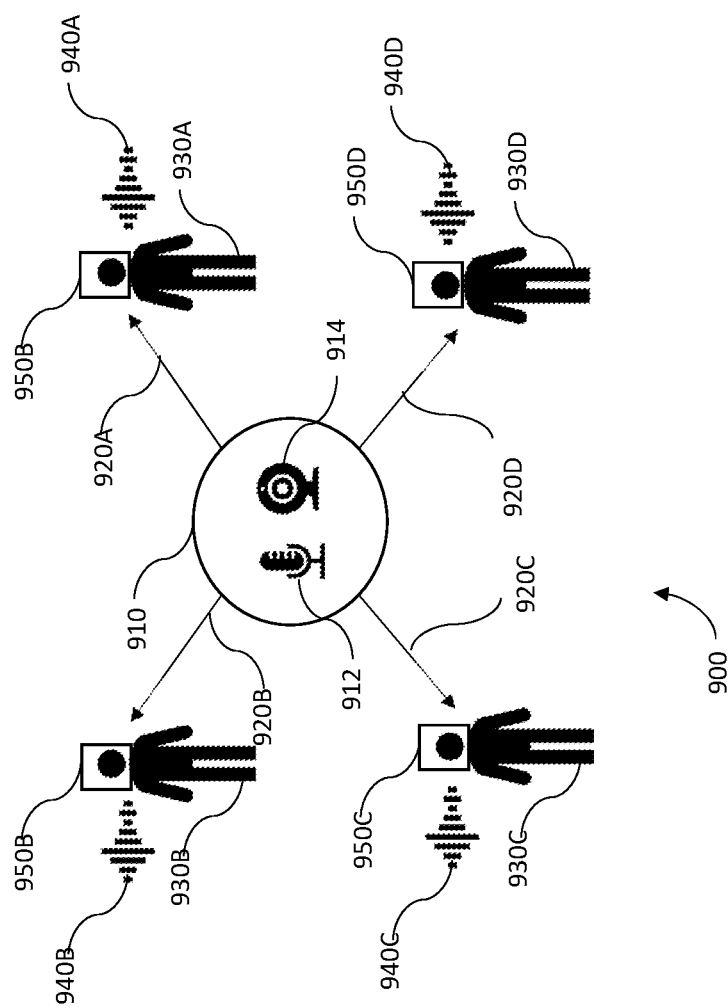
FIG. 9 illustrates an example embodiment of a plurality of contributing entities associated with a meeting from which electronic content is obtained with a meeting assistant device.

Attention will now be directed to FIG. 9, which illustrates an environment in which a meeting assistant device (i.e., services 120 of FIG. 1) is utilized to record electronic content associated with a meeting having a plurality of meeting participants (i.e., speakers). For example, FIG. 9 shows a meeting assistant device 910 including at least a microphone 912 configured to record audio data and a camera 914 having image and/or video recording capabilities which is configured to record visual data. A plurality of meeting participants (i.e., speakers and/or contributing entities) (e.g., participant 930A, 930B, 930C, 930D) are shown surrounding the meeting assistant device, wherein each participant is positioned in a specific direction in relation to the meeting assistant device 910. In some instances, the direction also relates to a distance from the device 910 to the meeting participant. For example, meeting participant 930A is positioned in direction 920A, meeting participant 930B is positioned in direction 920B, and so on.

The microphone 912 is configured to record audio speech (e.g., audio speech 940A, 940B, 940C, 940D) from one or more of the meeting participants. It is anticipated that the audio speech produced by each of the meeting participants is able to be recorded simultaneously and/or in series. For example, in some meetings participant 930A speaks, then meeting participant 930B speaks. In such an embodiment, the recorded audio captured by the microphone includes audio speech 940A followed by audio speech 940B.

In some instances, participants 930C and 930D are speaking at the same time as wherein audio 940C and audio 940D are overlapping in the recording captured by the microphone. Thus, in such instances, an ASR model (e.g., ASR model 140 of FIG. 1) is configured to identify each audio stream/audio recording and separate them into at least two recordings, one corresponding to audio speech 940C and one recording corresponding to audio speech 940D. The audio speech captured by the microphone 912 is then able to be used in downstream data processing such as speech-to-text transcription, transcript post-processing, summarization, template generation and/population, speech tagging, and/or user profile attribution.

It should also be appreciated that the microphone 912 is, in some instances, configured as a stand-alone speech service(s) device, such as a speech-enabled smart device. From the audio speech recorded, a voice profile (a meeting voice profile) is able to be generated for each meeting participant, wherein that voice profile is then associated with or linked to the user's base profile to supplement the user profile and/or to update a corresponding voice profile for that user profile and which enables subsequent linking of new content. For instance, subsequent audio speech from a particular meeting participant, either later in the same meeting or in a different meeting, can be attributed to the correct meeting participant based on the saved/updated user profile of that participant based on the previously linked/updated voice profile. With regard to the foregoing, the user profile can be a guest profile.

In some embodiments, the camera 914 is configured as a plurality of cameras configured to record each of the meeting participants. It will also be appreciated that in some embodiments, the camera 914 only records a meeting participant if they are speaking and/or moving and/or speaking and moving at a same time.

The system uses the video and/or image data captured by the camera 914 to create a face profile (a meeting face profile) for each of the meeting participants. The meeting assistant 910, via the camera 914, is also able to detect one or more faces (e.g., faces 950A, 950B, 950C, 950D) of each of the meeting participants that have saved user profiles. In particular a detected face (e.g., meeting face profile) can be matched to a saved face profile from one or more user profiles (or a guest profile) and can be used to supplement and/or update the saved user profiles (specifically the face profile portion of the user profile). Then, that updated user profile and/or the meeting face profile corresponding to the meeting participant can be used for subsequently linking new meeting content to the corresponding user/participant, similar to the voice profile matching described previously.

In some embodiments, the meeting assistant 910 is able to identify the meeting participant based on audio and/or visual features. For example, in some instances, the detected face 950A correspond to a known profile (i.e., a tagged user profile included in the plurality of stored user profiles). In some embodiments, the meeting assistant 910 detects changes or discrepancies between the detected face and the face profile corresponding to one or more meeting participants. These changes include longer or shorter hair, longer or shorter beard, change of hair color, aging, bruises, etc. In some instances, the detected changes are used to update the user profile, while in other instances, the changes are used in calculating the user profile confidence score (i.e., matching probability) for attribution but are not used to update the user profile.

In view of the foregoing, it will be appreciated that the disclosed embodiments provide many technical benefits over conventional systems and methods for automatically generating a meeting output (e.g., summaries, templates, user profiles, etc.), by improving the readability and accuracy of a transcription of electronic content associated with a meeting by performing post-processing that corrects punctuation, grammar and formatting introduced by the ASR model during the transcription process, as well as by replacing, modifying, omitting and/or adding to one or more words that were included in both the audio speech and the transcription (e.g., errors introduced by one or more of the participants).

In view of the foregoing, it will be appreciated that the technical benefits of the disclosed embodiments include In some instances, the disclosed embodiments provide technical benefits over conventional systems and methods for automatically attributing sub-portions of electronic content to contributing entities (i.e., contributors to or creators of the electronic content) associated with the electronic content by improving the accuracy and speed of identifying contributing entities by storing, in a known database, a plurality of user profiles corresponding to one or more contributing entities. Furthermore, in some instances, if a contributing entity is not recognized in the known database, the sub-portion will be attributed to a guest user profile, wherein the guest user profile can be later tagged with the correct identity of the contributing entity associated with the sub-portion of electronic content.

Technical benefits of the disclosed embodiments also include facilitating the automatic generation of improved outputs of downstream operations performed on the electronic content and user profiles, including the creation of transcriptions of the electronic content, summaries generated by abstractive summarization techniques and/or automatically populated templates, for example. In some instances, the transcription beneficially includes metadata obtained from one or more user profiles in the electronic content and/or transcribed audio speech to facilitate the generation of improved meeting outputs from the transcription. In some embodiments, the meeting output is a generated guest user profile or one or more updated stored user profiles.

Technical benefits of the disclosed embodiments also include facilitating the automatic generation of improved outputs of downstream operations performed on the transcriptions, including summaries generated by abstractive summarization techniques and/or automatically populated templates, for example. In some instances, the transcriptions also beneficially include speech tags identified in the electronic content and/or transcribed audio speech to facilitate the generation of improved meeting outputs.

Embodiments of the present invention may comprise or utilize a special purpose or general-purpose computer (e.g., computing system 110) including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media (e.g., storage 114 of FIG. 1) that store computer-executable instructions (e.g., components 116, 118 of FIG. 1) are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" (e.g., network 130 of FIG. 1) is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry, or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system for automatically processing electronic content and for generating corresponding output, the computing system comprises:
  one or more processors; and
  one or more computer readable hardware storage devices having stored computer-executable instructions that are executable by the one or more processors to cause the computing system to at least:
    identify electronic content associated with a meeting, the electronic content including audio speech;
    create a transcription of the audio speech with an automatic speech recognition (ASR) model trained on speech-to-text training data, the transcription being a text-based transcription;
    perform post-processing on the transcription, generating a post-processed transcription, by using a machine learning model trained on post-processing training data for modifying text included in the transcription, wherein the post-processing includes both (1) modifying at least one of a punctuation, grammar or formatting of the transcription that was introduced by the ASR model and (2) changing or omitting one or more words in the transcription which were included in both the audio speech and the transcription; and
    generate output based from the post-processed transcription, the output comprising a template that is generated at least in part from the post-processed transcription, the template comprising a meeting template that is automatically selected from a plurality of different templates based on a meeting type that is determined from analyzing the post-processed transcript and which is automatically populated with content from the post-processed transcript.

2. The computing system of claim 1, wherein the transcription includes a plurality of links corresponding to tags associated with the electronic content and wherein the computer-executable instructions are further executable by the one or more processors to cause the computing system to generate the tags from the electronic content.

3. The computing system of claim 2, wherein the plurality of links point to data related to the electronic content, but wherein the data related to the electronic content is external to the electronic content.

4. The computing system of claim 2, wherein the computing system uses a machine learning speech tagging model to generate the tags, the machine learning speech tagging model generating at least one tag in response to identifying a spoken starting keyword and a spoken ending keyword in the audio speech, and wherein the generating of the at least one tag includes classifying content of the audio speech as a particular note type, selected from a plurality of note types, based on the content which occurs between the starting keyword and the ending.

5. The computing system of claim 4, wherein the at least one tag comprises an action item note type that identifies one or more tasks and one or more entities associated with the one or more tasks.

6. The computing system of claim 5, wherein the at least one tag further includes links to one or more of an assigning party, a responsible party, a deadline, a content, or a priority level associated with the task.

7. The computing system of claim 1, wherein the readability of the transcription is modified when generating the post-processed transcription by converting a spoken language style of the audio speech to a written language style.

8. The computing system of claim 7, wherein the readability of the transcription is modified by determining a level of readability of individual words and phrases of the transcription and at least (1) removing words corresponding to a low level of readability, or (2) substituting words corresponding to a low level of readability with words corresponding to an increased level of readability, wherein the determining the level of readability is based on the individual words and phrases contributing to a semantic meaning and/or desired style inferred from the transcription.

9. The computing system of claim 1, wherein the post-processing training data is created by:
identifying ungrammatical sentences comprising text;
generating text-to-speech (US) data from the text;
transcribing the US data using an automatic speech recognition model; and
pairing the transcribed US data with the corresponding ungrammatical sentences.

10. The computing system of claim 1, wherein the output comprises the meeting summary which is automatically generated based on abstractive summarization of the post-processed transcription.

11. The computing system of claim 10, wherein the abstractive summarization is performed by a summarization model configured as a multi-level encoding-decoding neural network with attention.

12. The computing system of claim 11, wherein the summarization model is further configured to summarize the post-processed transcription based on both hierarchical attention at a turn-level and at a word-level.

13. The computing system of claim 12, wherein each turn is analyzed in context with a determined relationship between one or more of the turns of the plurality of turns.

14. The computing system of claim 1, wherein selection of one or more input fields of the meeting template that are automatically populated is based on user input.

15. The computing system of claim 1, wherein one or more fields of the meeting template are automatically populated with content identified in one or more tags that were generated by a speech tag machine learning model that processed at least one of the audio speech or the transcript or the post-processed transcript.

16. The computing system of claim 1, wherein the output generated from the post-processed transcript is further post-processed remove errors and modify text to improve the readability and accuracy of the output.

17. A computer-implemented method for automatically processing electronic content and for generating corresponding output, the method comprising:
identifying electronic content associated with a meeting, the electronic content including audio speech;
creating a transcription of the audio speech with an automatic speech recognition (ASR) model trained on speech-to-text training data, the transcription being a text-based transcription;
performing post-processing on the transcription, generating a post-processed transcription, by using a machine learning model trained on post-processing training data for modifying text included in the transcription, wherein the post-processing includes both (1) modifying at least one of a punctuation, grammar or formatting of the transcription that was introduced by the ASR model and (2) changing or omitting one or more words in the transcription which were included in both the audio speech and the transcription; and
generating output based from the post-processed transcription, the output comprising at least one of:
(i) a meeting summary generated by a machine learning summarization model that summarizes content of the post-processed transcription by at least breaking the post-processed transcription into a plurality of turns corresponding to a plurality of speakers, each turn being based on a role vector of a speaker corresponding to the turn, the role vector being (i) configured as a fixed-length vector trained to represent a role of the speaker and (ii) appended to an embedding of the turn, and wherein the summarization model selectively applies rules during analysis of each turn, with each of the rules being selectively applied based on one or more corresponding roles from which the role vector is determined, or
(ii) a template that is generated at least in part from the post-processed transcription, the template comprising a meeting template that is automatically selected from a plurality of different templates based on a meeting type that is determined from analyzing the post-processed transcript and which is automatically populated with content from the post-processed transcript.

18. One or more hardware storage devices comprising computer-executable instructions that are executable by one or more processers of a computing system to cause the computing system to:
identify electronic content associated with a meeting, the electronic content including audio speech;
create a transcription of the audio speech with an automatic speech recognition (ASR) model trained on speech-to-text training data, the transcription being a text-based transcription;
perform post-processing on the transcription, generating a post-processed transcription, by using a machine learning model trained on post-processing training data for modifying text included in the transcription, wherein the post-processing includes both (1) modifying at least one of a punctuation, grammar or formatting of the transcription that was introduced by the ASR model and (2) changing or omitting one or more words in the transcription which were included in both the audio speech and the transcription; and generate output based from the post-processed transcription, the output comprising at least one of:

(i) a meeting summary generated by a machine learning summarization model that summarizes content of the post-processed transcription by at least breaking the post-processed transcription into a plurality of turns corresponding to a plurality of speakers, each turn being based on a role vector of a speaker corresponding to the turn, the role vector being (i) configured as a fixed-length vector trained to represent a role of the speaker and (ii) appended to an embedding of the turn, and wherein the summarization model selectively applies rules during analysis of each turn, with each of the rules being selectively applied based on one or more corresponding roles from which the role vector is determined, or (ii) a template that is generated at least in part from the post-processed transcription, the template comprising a meeting template that is automatically selected from a plurality of different templates based on a meeting type that is determined from analyzing the post-processed transcript and which is automatically populated with content from the post-processed transcript.

19. The one or more hardware storage devices of claim 18, wherein the one or more corresponding roles of the speaker is inferred during analysis of the post-processed transcription.

20. The one or more hardware storage devices of claim 18, wherein certain role vectors are weighted more heavily than other role vectors and wherein the meeting summary comprises a greater portion of summarized content from the certain role vectors which are weighted more heavily than the other role vectors.

\* \* \* \* \*